US010993281B2

(12) United States Patent
Mikuriya et al.

(10) Patent No.: US 10,993,281 B2
(45) Date of Patent: Apr. 27, 2021

(54) MANAGEMENT DEVICE, TERMINAL DEVICE, AND NON-TRANSITORY STORAGE MEDIUM

(71) Applicant: JVCKENWOOD Corporation, Yokohama (JP)

(72) Inventors: Junichi Mikuriya, Yokohama (JP); Ichiro Shishido, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 0 days.

(21) Appl. No.: 16/824,883

(22) Filed: Mar. 20, 2020

(65) Prior Publication Data

US 2020/0314951 A1  Oct. 1, 2020

(30) Foreign Application Priority Data

Mar. 25, 2019  (JP) .............................. JP2019-057299

(51) Int. Cl.

| H04W 4/08 | (2009.01) |
|---|---|
| H04W 76/40 | (2018.01) |
| H04W 4/06 | (2009.01) |
| H04W 72/04 | (2009.01) |
| H04W 88/02 | (2009.01) |
| H04W 88/18 | (2009.01) |

(52) U.S. Cl.

CPC ............. *H04W 76/40* (2018.02); *H04W 4/06* (2013.01); *H04W 72/0426* (2013.01); *H04W 4/08* (2013.01); *H04W 88/02* (2013.01); *H04W 88/18* (2013.01)

(58) Field of Classification Search

CPC ...................................................... H04W 4/08
See application file for complete search history.

(56) References Cited

U.S. PATENT DOCUMENTS

| 2017/0265018 A1* | 9/2017 | Mok ....................... H04W 4/90 |
| 2019/0239071 A1* | 8/2019 | Krishnan .......... H04W 12/0052 |
| 2020/0314964 A1* | 10/2020 | Mikuriya ................ H04W 4/08 |

FOREIGN PATENT DOCUMENTS

JP   2008-005169   1/2008

* cited by examiner

*Primary Examiner* — Barry W Taylor
(74) *Attorney, Agent, or Firm* — Amin, Turocy & Watson, LLP

(57) ABSTRACT

Provided is a management device including an acquirer configured to acquire base station information indicating an operational status of a base station device in group communication and terminal device operational information indicating whether a call-destination terminal device registered in the base station device is capable of receiving the group communication, a processor configured to create communication result information in which information that identifies the base station device, information that identifies the call-destination terminal device, and participation information on the call-destination terminal device whether to participate in the group communication are associated with one another, and a transmitter configured to transmit the communication result information, wherein the processor is configured to create the participation information to identify a state of participation and a state of non-participation due to a factor on a call-destination terminal device side and a state of non-participation due to a factor on a base station device side.

11 Claims, 13 Drawing Sheets

FIG.4

| TERMINAL DEVICE ID | USER ID | GROUP ID | BASE STATION ID | REGISTRATION STATE |
|---|---|---|---|---|
| #20a-1 | #U1 | #1 | #A | REGISTERED |
| #20a-2 | #U2 | #1 | #A | REGISTERED |
| #20a-3 | #U3 | #1000 | #A | REGISTERED |
| #20a-4 | #U4 | #1 | #A | UNREGISTERED |
| #20b-1 | #U5 | #1 | #B | REGISTERED |
| #20b-2 | #U6 | #1 | #B | REGISTERED |
| #20b-3 | #U7 | #1 | #B | REGISTERED |
| #20c-1 | #U8 | #1 | #C | REGISTERED |
| #20c-2 | #U9 | #1 | #C | REGISTERED |
| #20c-3 | #U10 | #1 | #C | REGISTERED |
| #20d-1 | #U11 | #1 | #D | REGISTERED |
| #20d-2 | #U12 | #1 | #D | REGISTERED |
| #20d-3 | #U13 | #1 | #D | REGISTERED |

FIG.6

| TERMINAL DEVICE ID | USER ID | BASE STATION ID | PARTICIPATION INFORMATION |
|---|---|---|---|
| #20a-2 | #U2 | #A | PARTICIPATION |
| #20a-4 | #U4 | #A | POWER-OFF |
| #20b-1 | #U5 | #B | RESOURCE SHORTAGE |
| #20b-2 | #U6 | #B | RESOURCE SHORTAGE |
| #20b-3 | #U7 | #B | RESOURCE SHORTAGE |
| #20c-1 | #U8 | #C | PARTICIPATION |
| #20c-2 | #U9 | #C | PARTICIPATION |
| #20c-3 | #U10 | #C | PARTICIPATION |
| #20d-1 | #U11 | #D | NETWORK FAULT |
| #20d-2 | #U12 | #D | NETWORK FAULT |
| #20d-3 | #U13 | #D | NETWORK FAULT |

261

MANAGEMENT DEVICE, TERMINAL DEVICE, AND NON-TRANSITORY STORAGE MEDIUM

CROSS-REFERENCE TO RELATED APPLICATIONS

This application claims priority from Japanese Application No. 2019-057299, filed on Mar. 25, 2019, the contents of which are incorporated by reference herein in its entirety.

FIELD

The present invention relates to a management device, a terminal device, and a non-transitory storage medium.

BACKGROUND

In a radio communication system, voice communication or the like is performed through a radio base station device located in a wide area, within a group including a plurality of mobile stations.

For example, Japanese Laid-open Patent Publication No. 2008-5169 describes a technique for displaying information on a mobile station that could not answer a calling because of the presence outside the service range of a network and/or a mobile station that moved out of the service range during group communication, onto mobile stations in the group. Further, Japanese Laid-open Patent Publication No. 2008-5169 describes a technique for a mobile station to participate halfway in (rejoin) group communication when the mobile station returns into the service range from outside the range. Further, Japanese Laid-open Patent Publication No. 2008-5169 also describes a technique for allowing a mobile station to participate halfway in group communication while reflecting the intention of a user who is participating in the group communication, by displaying information on a mobile station that did not answer and/or information on a mobile station that was present outside the service range, on the display part of the call-origination side.

Japanese Laid-open Patent Publication No. 2008-5169 only considers that a mobile station is present outside the service range, as a factor of preventing participation of the mobile station in group communication. In a communication system configured using the base station devices and a network, however, there is a case where a mobile station cannot participate in group communication, even if the mobile station is present within the service range. That is, for example, the case where, in a wide-area communication system where a plurality of base station devices are connected via a network, the base station devices assign resources (for example, channels) to the groups, respectively, and group communication is executed. In this case, while one base station devices implement group communication, another base station device may lack resources and thus may be not able to implement group communication. For this reason, provision of detailed information on the communication status of group communication, such as information on a group communication failure resulting from base station device, is desired.

The disclosure provides a management device, a terminal device, and a non-transitory storage medium that enable provision of detailed information on the communication status of group communication.

SUMMARY

It is an object of the present invention to at least partially solve the problems in the conventional technology.

According to one aspect, there is provided a management device including an acquirer configured to acquire base station information indicating an operational status of a base station device in group communication and terminal device operational information indicating whether a call-destination terminal device registered in the base station device is in a state capable of receiving the group communication, a processor configured to create, based on the base station information and the terminal device operational information acquired by the acquirer, communication result information in which information that identifies the base station device, information that identifies the call-destination terminal device, and participation information on the call-destination terminal device whether to participate in the group communication are associated with one another, and a transmitter configured to transmit the communication result information created by the processor, wherein the processor is configured to create the participation information that makes it possible to identify a state of participation where the call-destination terminal device has participated in the group communication, a state of non-participation where the call-destination terminal device does not participate in the group communication due to a factor on a call-destination terminal device side and a state of non-participation where the call-destination terminal device does not participate in the group communication due to a factor on a base station device side.

According to one aspect, there is provided a terminal device including a transmitter configured to transmit a group communication start request to a base station device, a receiver configured to receive communication result information including base station identification information that makes it possible to identify the base station device in response to the group communication start request, terminal device identification information that makes it possible to identify a call-destination terminal device registered in the base station device, and participation information on the call-destination terminal device whether to participate in the group communication in association with one another, a processor configured to create a diagram illustrating terminal device identification information on the call-destination terminal device registered in the base station device and the participation information on the call-destination terminal device in association with the base station identification information, based on the communication result information received by the receiver, and a display configured to display the diagram, wherein the participation information makes it possible to identify a state of participation where the call-destination terminal device has participated in the group communication, a state of non-participation where the call-destination terminal device does not participate in the group communication due to a factor on a call-destination terminal device side and a state of non-participation where the call-destination terminal device does not participate in the group communication due to a factor on a base station device side.

According to one aspect, there is provided a non-transitory computer-readable recording medium that stores a program that causes a computer to execute a process including transmitting a start request for group communication designating a call-destination terminal, receiving communication result information including terminal device identification information that makes it possible to identify the call-destination terminal in response to the start request and participation information on the call-destination terminal device whether to participate in the group communication, based on the communication result information received in the receiving process, creating a diagram illustrating at least whether the call-destination terminal has participated in the group communication, and displaying the diagram, wherein, in a case of non-participation where the call-destination terminal has not participated in the group communication, the participation information makes it possible to identify at least two factors of the non-participation, one factor resulting from that the participation in the group communication was refused by the call-destination terminal, another factor resulting from that a response result was not be returned from the call-destination terminal within a predetermined time, and wherein the diagram illustrating the terminal device identification information of the call-destination terminal that has not participated in the group communication is displayed for each factor in a different display mode.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an exemplary data structure of a terminal device database;

FIG. 6 is a diagram illustrating an exemplary data structure of a participation information database;

DETAILED DESCRIPTION OF THE PREFERRED EMBODIMENTS

An embodiment according to the present invention will be explained below in detail with reference to the accompanying drawings. The present invention is not limited to the following embodiment. Further, where there are a plurality of embodiments, the present invention also encompasses those configured by combining the embodiments.

Before a specific explanation on the present invention, an explanation will first be given of an outline of a business-use radio system. An embodiment of the present invention relates to a business-use radio system that includes a plurality of base station devices connected to a network, a plurality of terminal devices, and a system management device connected to the network.

In the field of land mobile radio systems (LMR: Land Mobile Radio) that are mainly used for business purposes, there are a plurality of system forms, which are roughly categorized into two systems of a trunking system and a conventional system. For the sake of brevity of description, the present embodiment will be described by taking the trunking system as an example. However, the present invention is not limited to the trunking system, but can be applied to the conventional system. Further, the present invention is not limited to a business-use radio system, but can be applied to other communication systems, such as a communication system using a mobile phone network.

In the trunking system, in order to share a radio channel and thereby use the frequency efficiently, a communication channel is assigned to mobile stations every time communication rises up by using the line control device of a base station device, so that the system enables communication to be performed between the mobile stations through the base station device located in each place is formed. In the case of a business-use radio system, a group is formed of a plurality of mobile stations.

Radio Communication System

Figure 1:
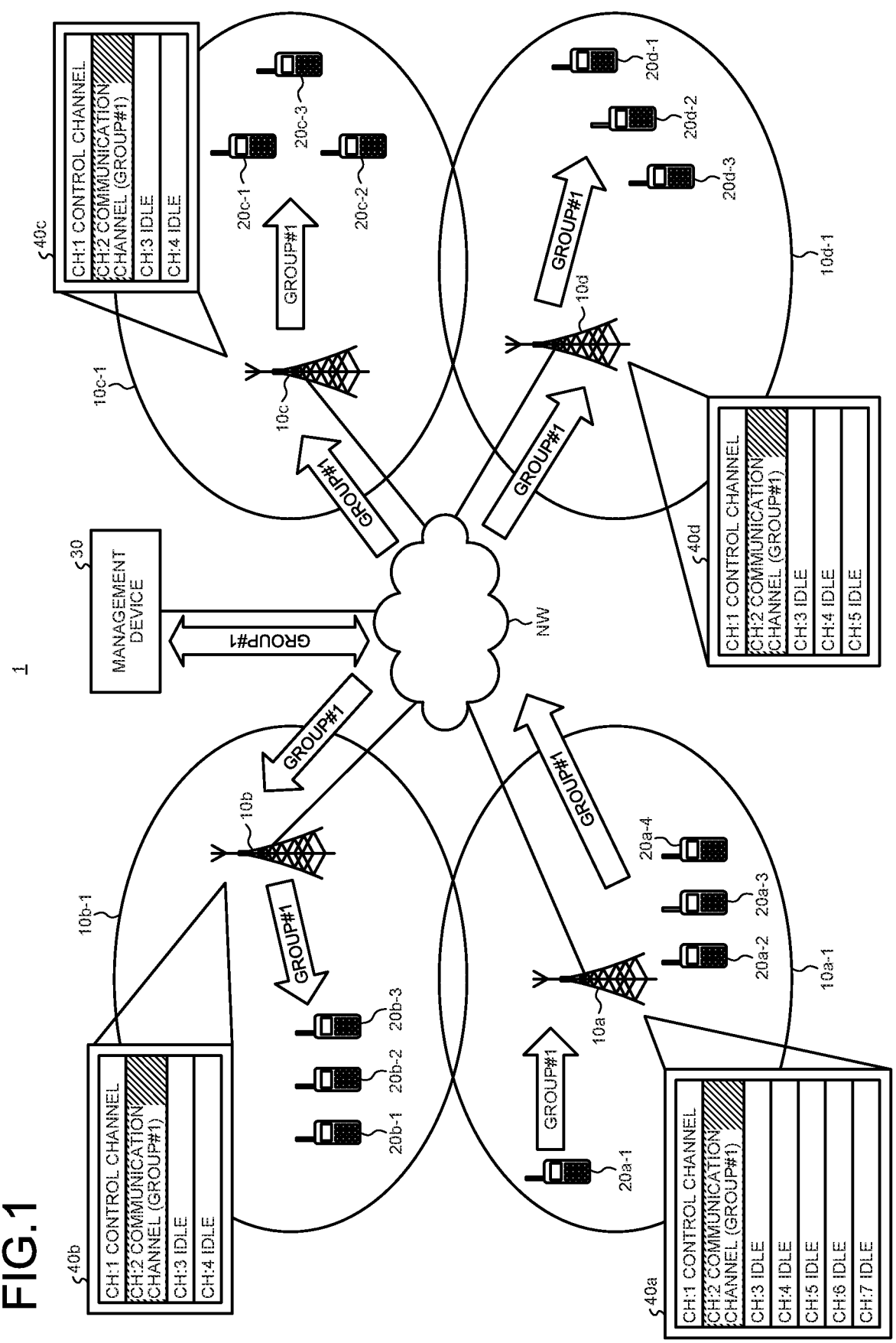
FIG. 1 is a schematic diagram illustrating a configuration of a radio communication system according to an embodiment of the disclosure.

With reference to FIG. 1, an explanation will be given of the configuration of a radio communication system 1 according to an embodiment of the present invention. FIG. 1 is a schematic diagram illustrating the configuration of the radio communication system 1 according to an embodiment of the present invention. The radio communication system 1 illustrated in FIG. 1 is a business-use radio system, for example.

The radio communication system 1 includes a base station device 10a, a base station device 10b, a base station device 10c, a base station device 10d, a terminal device 20a-1, a terminal device 20a-2, a terminal device 20a-3, a terminal device 20a-4, a terminal device 20b-1, a terminal device 20b-2, a terminal device 20b-3, a terminal device 20c-1, a terminal device 20c-2, a terminal device 20c-3, a terminal device 20d-1, a terminal device 20d-2, a terminal device 20d-3, and a management device 30. The radio communication system 1 illustrated in FIG. 1 is a mere example, and is not intended to limit the number of base station devices nor the number of terminal devices. Further, in the following description, when the base station device 10a, the base station device 10b, the base station device 10c, and the base station device 10d do not need distinction mutually, each of these devices may also be referred to as "base station device 10" used as a general term. When the terminal device 20a-1, the terminal device 20a-2, the terminal device 20a-3, the terminal device 20a-4, the terminal device 20b-1, the terminal device 20b-2, the terminal device 20b-3, the terminal device 20c-1, the terminal device 20c-2, the terminal device 20c-3, the terminal device 20d-1, the terminal device 20d-2, and the terminal device 20d-3 do not need distinction mutually, each of these devices may also be referred to as "terminal device 20" used as a general term. The base station devices 10 are connected to the management device 30 through a network NW.

The base station device 10a forms a communication area 10a-1. The base station device 10a performs radio communication with the terminals present in the communication area 10a-1. In the example illustrated in FIG. 1, the base station device 10a performs radio communication with the terminal device 20a-1, the terminal device 20a-2, the terminal device 20a-3, and the terminal device 20a-4. The communication area 10a-1 may be referred to as "area A". The base station device 10a is set with a plurality of channels CH1 to CH7, as illustrated in channel information 40a. The CH1 is a control channel. The CH2 to CH7 are channels used for communication channels. The communication channel means a channel for transmitting data, such as audio, image, video, and text, exchanged between terminal devices 20. In the example illustrated in FIG. 1, the CH2 is a communication channel dynamically assigned for group communication whose group ID is "group #1". In the example illustrated in FIG. 1, the CH3 to CH7 are in an idle state. Each channel in an idle state is to be used as a communication channel when group communication is performed for a group different from the group "group #1" to which the CH2 is assigned.

The base station device 10b forms a communication area 10b-1. The base station device 10b performs radio communication with the terminals present in the communication area 10b-1. In the example illustrated in FIG. 1, the base station device 10b performs radio communication with the terminal device 20b-1, the terminal device 20b-2, and the terminal device 20b-3. The communication area 10b-1 may be referred to as "area B". The base station device 10b is set with a plurality of channels CH1 to CH4, as illustrated in channel information 40b. The CH1 is a control channel. The CH2 to CH4 are channels used for communication channels. In the example illustrated in FIG. 1, the CH2 is a communication channel dynamically assigned for the group communication whose group ID is "group #1". In the example illustrated in FIG. 1, the CH3 and CH4 are in an idle state.

The base station device 10c forms a communication area 10c-1. The base station device 10c performs radio communication with the terminals present in the communication area 10c-1. In the example illustrated in FIG. 1, the base station device 10c performs radio communication with the terminal device 20c-1, the terminal device 20c-2, and the terminal device 20c-3. The communication area 10c-1 may be referred to as "area C". The base station device 10c is set with a plurality of channels CH1 to CH4, as illustrated in channel information 40c. The CH1 is a control channel. The CH2 to CH4 are channels used for communication channels. In the example illustrated in FIG. 1, the CH2 is a communication channel dynamically assigned for the group communication whose group ID is "group #1". In the example illustrated in FIG. 1, the CH3 and CH4 are in an idle state.

The base station device 10d forms a communication area 10d-1. The base station device 10d performs radio communication with the terminals present in the communication area 10d-1. In the example illustrated in FIG. 1, the base station device 10d performs radio communication with the terminal device 20d-1, the terminal device 20d-2, and the terminal device 20d-3. The communication area 10d-1 may be referred to as "area D". The base station device 10d is set with a plurality of channels CH1 to CH5, as illustrated in channel information 40d. The CH1 is a control channel. The CH2 to CH5 are channels used for communication channels. In the example illustrated in FIG. 1, the CH2 is a communication channel dynamically assigned for the group communication whose group ID is "group #1". In the example illustrated in FIG. 1, the CH3 and CH5 are in an idle state.

Each terminal device 20 is a radio terminal that can communicate with the other terminal devices through the base station devices 10. When the power is turned on or when the reception electric field intensity during standby decreases, the terminal device 20 searches the control channels to select a base station device with the best line quality, and requests location registration and group registration to the base station device thus selected.

Hereinafter, an explanation will be given of an outline of the location registration (location registration process) and the group registration (group registration process).

The location registration is a process of registering information on a terminal device 20 and information on a base station device 10 to be used by the terminal device 20 from now, into the management device 30. Specifically, first, the terminal device 20 transmits a location registration request to the base station device 10 to be used from now. Upon reception of the location registration request, the base station device 10 registers information including identification information on the base station device 10 and identification information on the terminal device 20, into the management device 30. By the location registration, the management device 30 can grasp the area where the terminal device 20 is present (the base station device 10 that can communicate with the terminal device 20). Consequently, the management device 30 can specify the base station device 10 to be used when communication with the terminal device 20 rises up. For example, when the terminal device 20a-1 sends a call (or originates a call) toward the terminal device 20b-1, the base station device 10a receives radio waves, and relays the radio waves to the base station device 10b. In such a process, the terminal device 20b-1 performs registration into the management device through the base station device 10b, so that the management device 30 can specify that the base station device 10b is a base station device to be used when communication related to the terminal device 20b-1 rises up. Hereinafter, a terminal device 20 that sends a call (or originates a call) for communication will be referred to as "sender terminal" or "call-origination terminal". Further, a terminal device 20 that is designated as a communication partner by a call-origination terminal, i.e., a terminal device 20 serving as a called object, will be referred to as "call-destination terminal". In the case of one-to-one individual communication, the management device 30 can immediately transmit a signal for announcing an incoming call to the base station device 10 in the area where the call-destination terminal is present. As the location registration for a terminal device 20 is performed, it is possible to save the trouble of searching for the terminal device 20, and thereby operate the radio communication system 1 efficiently.

The group registration is a process of registering a group to be used for group communication by a terminal device 20, into the management device 30. By the group registration, the management device 30 can grasp the base station device 10 in the area where each call-destination terminal belonging to the group designated by a call-origination terminal is present. Accordingly, the management device 30 can easily specify the area where each terminal device 20 belonging to the group designated by the call-origination terminal is present, and thereby perform group communication efficiently. Here, even after the group registration is performed, the user can change the group to which a terminal device 20 belongs by performing a predetermined operation.

Each terminal device 20 deletes its own location information stored in the management device 30 by sending notice of deletion of the location registration to the base station device 10, when the power is turned off. The management device 30 centrally manages the location information on the terminal devices 20. Accordingly, the management device 30 can grasp the terminal devices 20 present in each of the areas. The management device 30 can also grasp the area where each terminal device 20 serving as a group calling object is present, by performing the group registration for the terminal device 20. Accordingly, the management device 30 can perform group calling efficiently, by using the registered areas as a calling range.

Here, an explanation will be given of an outline of a process of starting group communication.

When call-origination for starting group communication rises up in a terminal device 20, the terminal device 20 transmits a group communication request to the base station device 10 through the control channel. Upon reception of the group communication request, the base station device 10 secures resources for performing the group communication. For example, a typical resource is a channel, and the base station device 10 assigns a channel for the group communication. The base station device 10 requests the management device 30 for the group communication. Upon reception of the request, the management device 30 confirms whether there is registration of base station device areas for this group. When there is registration, the management device 30 requests each of the other base station devices to assign a channel to this group, through the network. Each of the other base station devices secures resources for the group communication, in response to the request.

Each of the base station device 10 serving as a sending source and the other base station devices transmits a request including communication channel information to terminal devices 20 through the control channel. Each terminal device 20 belonging to this group recognizes the communication channel by receiving a request including the communication channel information through the control channel. The call-origination terminal transmits a signal through the assigned communication channel to the base station device 10. This signal contains a digitized audio signal. The base station 10 that has received the signal from the call-origination terminal distributes the received signal to the terminal devices 20 belonging to this group through the assigned communication channel. Further, the base station device 10 transmits the received signal to the management device 30. The management device 30 distributes the received signal to other base station devices. Each of the other base station devices transmits the signal to terminal devices 20 (call-destination terminals) through the assigned communication channel. Each of the terminal devices 20 (call-destination terminal) decodes the audio signal based on the received signal, and outputs audio from a speaker.

As described above, a plurality of groups each including a plurality of terminal devices are formed. Further, each of the plurality of base station devices assigns a channel to each group. As a result, communication is performed from one terminal device included in a group to which the channels are assigned, to the other terminal devices included in this group.

Such group communication uses one channel of each base station device when the group communication rises up by one time. Accordingly, in a case where terminal devices belonging to the same group are registered in the plurality of base station devices, the number of channels used for group communication of one time is corresponding to the number of these base station devices in the entire system. The above process is performed for each group.

With reference to FIG. 1, a specific explanation will be given. FIG. 1 illustrates an operation of each base station device in a case where group communication of the "group #1" is performed. However, substantially the same operation can be applied to a case where group communication of another group is performed. In the following description with reference to FIG. 1, it is assumed that the terminal device 20a-1 present in the communication area 10a-1 is a call-origination terminal device.

The terminal device 20a-1 transmits a signal for requesting communication by using the control channel CH1 of the base station device 10a. This signal will also be referred to as "call-origination request", "communication request", "group communication request" or "group communication start request". In the management device 30, each terminal device belonging to the "group #1" and area information thereon are registered in association with each other. Accordingly, the management device 30 judges the area information on each terminal device belonging to the "group #1", and transmits a channel assignment request for the "group #1" to the base station device 10b, the base station device 10c, and the base station device 10d. Each terminal device present in the communication area of each base station device receives signals by using a communication channel of the base station device. In the example illustrated in FIG. 1, the communication channel CH2 of each of the base station device 10b, the base station device 10c, and the base station device 10d is used for signal reception.

Figure 2:
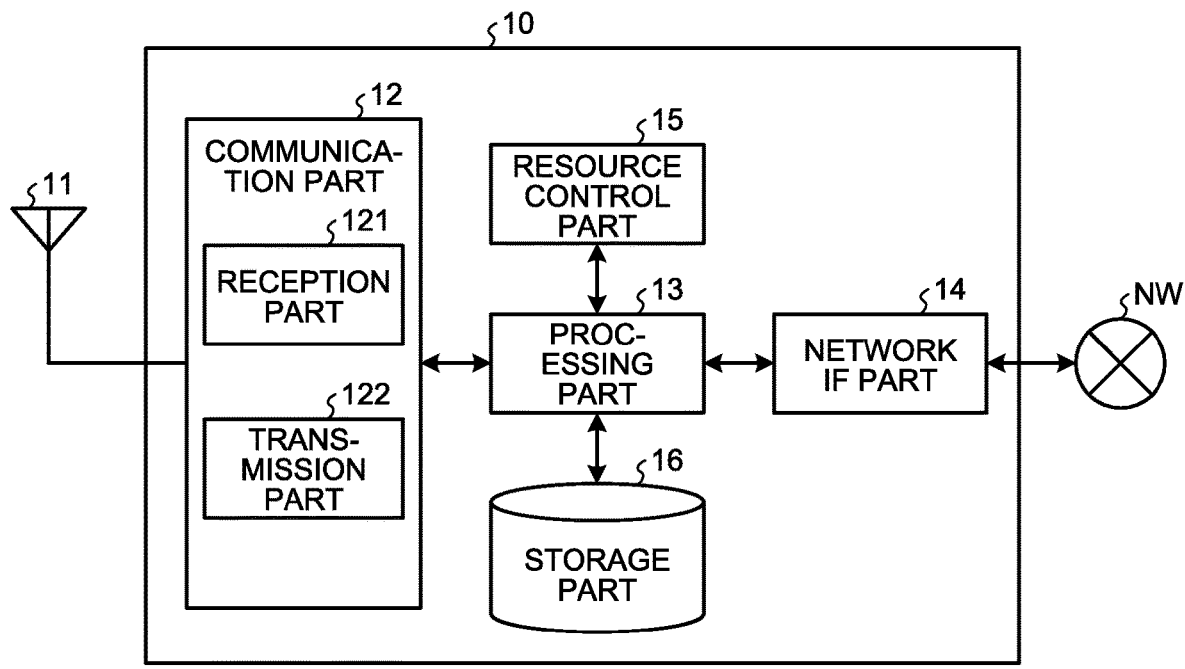
FIG. 2 is a block diagram illustrating an exemplary configuration of base station device according to the embodiment of the disclosure.

With reference to FIG. 2, an explanation will be given of the configuration of each base station device 10 according to this embodiment of the present invention. FIG. 2 is a block diagram illustrating an example of the configuration of the base station device 10.

The base station device 10 includes an antenna 11, a communication part 12, a processing part 13 (also referred to a processor 13), a network IF (Inter Face) part (also referred to a network inter face) 14, a resource control part 15, and a storage part 16.

The communication part 12 performs information communication with the terminal devices 20. The communication part 12 includes a reception (also referred to a receiver) part 121 and a transmission part (also referred to a transmitter) 122.

The reception part 121 receives uplink signals from each terminal device 20 through the antenna 11. The uplink signals to be received by the reception part 121 include various kinds of information transmitted from each terminal device 20, such as an audio signal, location registration information, and a group communication request, from the terminal device 20. The reception part 121 outputs the uplink signals received from each terminal device 20 to the processing part 13.

The transmission part 122 transmits downlink signals to each terminal device 20 through the antenna 11. The downlink signals to be transmitted by the transmission part 122 include information input from the processing part 13, such as an audio signal and a group communication request.

The processing part 13 processes various signals. When the reception part 121 receives a location registration request, the processing part 13 outputs this location registration request to the storage part 16. The storage part 16 stores unit information and awaited group information, concerning each terminal device. Further, the processing part 13 outputs the location registration request to the network IF part 14. The network IF part 14 transmits the location registration request to the management device 30 through the network NW. As described later, the location registration request to be transmitted from the base station device 10 to the management device 30 includes a terminal device ID (terminal identifier) for identifying the terminal device 20, a user ID (user identifier) for identifying the user who uses the terminal device 20, a group ID (group identifier) for identifying the group to which the terminal device 20 belongs, and a base station ID (base station identifier) for identifying the base station device 10 that has received the location registration request from the terminal device 20 (radio waves from the terminal device 20).

When the reception part 121 receives a group communication request, the processing part 13 outputs this group communication request to the resource control part 15. The resource control part 15 manages resources necessary for communication. A typical resource is a channel to be used for radio communication. Further, other than the channel, those called resources include the processing capacity and/or the amount of power to be used, in a CPU (Central Processing Unit), a memory, and so forth necessary for executing a communication process in the base station device 10. The resource control part 15 monitors channel assignment management for group communication, availability of the CPU and the memory, power consumption, and so forth. The resource control part 15 outputs communication channel information to the processing part 13 when the resources are secured. The processing part 13 outputs the communication channel information to the transmission part 122. The transmission part 122 sends notice of the communication channel information to the call-origination terminal device 20.

When the reception part 121 receives an audio signal, the processing part 13 outputs this audio signal to the network IF part 14. The network IF part 14 transmits the audio signal to the management device 30 through the network NW.

The network IF part 14 receives a channel assignment request for group communication that has risen up at another base station device, from the management device 30. The network IF part 14 outputs the channel assignment request to the processing part 13. The processing part 13 outputs the channel assignment request for the group communication to the resource control part 15. The resource control part 15 secures resources on the basis of the channel assignment request. Upon success in securing resources, the resource control part 15 outputs communication channel information to the processing part 13. The processing part 13 outputs the received communication channel information to the transmission part 122. Further, the processing part 13 outputs a channel securing response (success) to the network IF part 14. On the other hand, upon failure in securing resources, the resource control part 15 outputs a channel securing response (failure) to the processing part 13. The processing part 13 outputs the received channel securing response (failure) to the network IF part 14. The network IF part 14 notifies the management device 30 of information on the channel securing response (success) or the channel securing response (failure). As the channel securing response (success or failure) is information that indicates the operation status of the base station device 10, the resource securing response will also be referred to as "operation information on base station device" or "base station operation information". Hereinafter, the "channel securing response (success)" may be referred to as "success response", and the "channel securing response (failure)" may be referred to as "failure response".

The network IF part 14 transmits the resource securing response to the management device 30. Upon reception of an audio signal from the management device 30, the network IF part 14 outputs this audio signal to the processing part 13. The processing part 13 outputs the audio signal to the transmission part 122. The transmission part 122 transmits the audio signal received from the processing part 13 to each terminal device 20 through the antenna 11.

Figure 3:
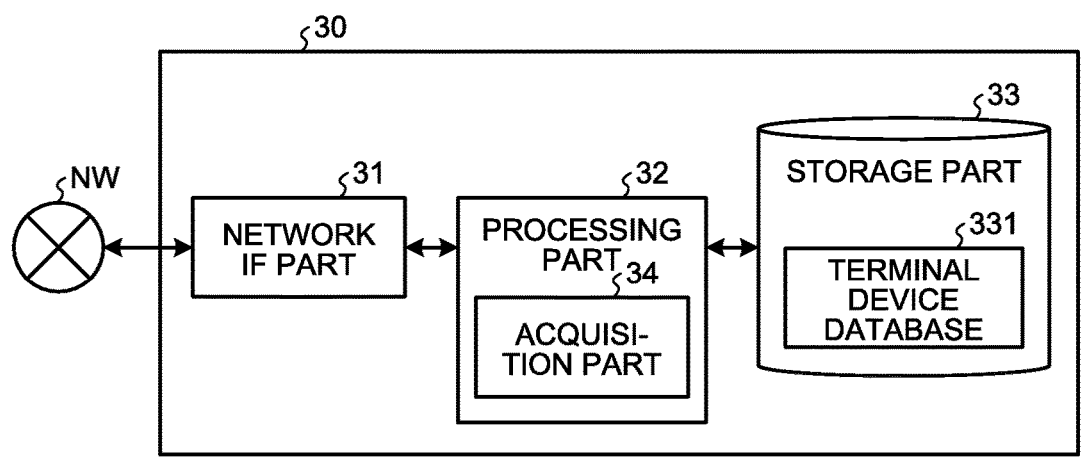
FIG. 3 is a block diagram illustrating an exemplary configuration of a management device according to the embodiment of the disclosure.

With reference to FIG. 3, an explanation will be given of the configuration of the management device 30 according to this embodiment of the present invention. FIG. 3 is a block diagram illustrating an example of the configuration of the management device 30 according to this embodiment of the present invention.

The management device 30 includes a network IF part 31, a processing part (also referred to a processor) 32, and a storage part 33. The processing part 32 includes an acquisition part (also referred to an acquirer) 34.

The network IF part 31 transmits or receives a location registration request, a call-origination request, an audio signal, an end notice, a report notice on terminal device participation status, a resource securing result response, and so forth from each base station device 10 through the network NW, and outputs them to the processing part 32.

Upon reception of a call-origination request, the processing part 32 searches the storage part 33, and, on the basis of a group name (group ID) included in the call-origination request, acquires the base station device ID of each area having registration of the group. Then, the processing part 32 transmits information on "group participation request" to each base station device 10 having registration of the group, through the network NW. Hereinafter, the "group participation request" may also be referred to as "participation request". The processing part 32 collects, from each base station device 10 related to the group communication, all information indicating, e.g., whether a terminal device calling process has been executed in accordance with the "group participation request", and creates (generates) group participation information. Then, the processing part 32 sends notice of the created group participation information to the call-origination terminal device 20 through the network NW. The group participation information will also be referred to as "communication result information". The acquisition part 34 is included in the processing part 32, and thus the acquisition part 34 can be said to be part of the processing part 32. As described later, the acquisition part 34 acquires data necessary for the processing part 32 to create the group participation information, from each base station device 10 through the network IF part 31, or the storage part 33. As described above, the network IF part 31 also serves as a receiver and a transmitter.

The storage part 33 stores various kinds of data. For example, the storage part 33 stores a terminal device database 331. The terminal device database 331 includes various kinds of information on terminal devices registered in each base station device.

Upon receiving a location registration request from the base station device 10, the network IF unit 31 outputs the location registration request to the processing part 32 and the processing part 32 determines whether to give permission to the location registration request. Specifically, the processing part 32 refers to a list of terminal device IDs (registerable terminal device list) that is previously stored in the storage part 33 and, when a terminal device ID contained in the location registration request is contained in the registerable terminal device list, the processing part 32 determines to permit the registration. On the other hand, when the terminal device ID contained in the location registration request is not contained in the registerable terminal device list, the processing part 32 determines not to permit the registration. When the registration is permitted, processing part 32 stores a terminal device ID, a user ID, a group ID, a base station ID, that are contained in the location registration request in the terminal device database 331. On the other hand, when the processing part 32 determines not to permit the registration, the processing part 32 does not store the information of the location registration request in the terminal device database 331. In other words, the terminal device database 331 stores information on only the terminal device 20 whose location registration request is given permission. The management device 30 may notify the base station device 10 of the result of determination to permit the registration or not to permit the registration. The base station device 10 may further notify the terminal device 20 of the determination result.

With reference to FIG. 4, an explanation will be given of the terminal device database 331. FIG. 4 is a diagram illustrating an example of the data structure of the terminal device database 331.

As illustrated in FIG. 4, in the terminal device database 331, a "terminal device ID", a "user ID", a "group ID", a "base station ID", and a "registration state" are associated with one another. In other words, the terminal device database 331 stores a "user ID", a "group ID", a "base station ID", and a "registration state" per terminal device. The registration state is also referred to as registration information. As described above, a "terminal device ID", a "user ID", a "group ID", and a "base station ID" are information contained in the location registration request that is received from the base station device 10. When it is determined that the registration is permitted, the management device 30 adds a new column to the terminal device database 331 and the registration state in that case is "registered". In other words, the default value of the registration state field is "registered".

The "terminal device ID" is terminal device identification information for uniquely identifying a terminal device. The terminal device whose "terminal device ID" is "#20a-1" is the terminal device 20a-1. The terminal device whose "terminal device ID" is "#20a-2" is the terminal device 20a-2. The terminal device whose "terminal device ID" is "#20a-3" is the terminal device 20a-3. The terminal device whose "terminal device ID" is "#20a-4" is the terminal device 20a-4. The terminal device whose "terminal device ID" is "#20b-1" is the terminal device 20b-1. The terminal device whose "terminal device ID" is "#20b-2" is the terminal device 20b-2. The terminal device whose "terminal device ID" is "#20b-3" is the terminal device 20b-3. The terminal device whose "terminal device ID" is "#20c-1" is the terminal device 20c-1. The terminal device whose "terminal device ID" is "#20c-2" is the terminal device 20c-2. The terminal device whose "terminal device ID" is "#20c-3" is the terminal device 20c-3. The terminal device whose "terminal device ID" is "#20d-1" is the terminal device 20d-1. The terminal device whose "terminal device ID" is "#20d-2" is the terminal device 20d-2. The terminal device whose "terminal device ID" is "#20d-3" is the terminal device 20d-3.

A "user ID" is user identification information for identifying a user who uses the terminal device. For example, the user who uses the terminal device 20a-1 corresponds to "#U1". A "user ID" may be a real name or a nickname. Note that "user IDs" may be omitted.

A "group ID" is group identification information for identifying a group that is associated with the terminal device 20. In the example represented in FIG. 4, "group #1000" is associated with the terminal device 20a-3 and "group #1" is associated with each of other terminal devices. Multiple "group IDs" may be associated with each terminal device. In other words, one terminal device can belong to multiple groups.

A "base station ID" is base station identification information for identifying a base station to which the terminal device is connected. A "base station to which the terminal device is connected" may be also referred to as a "base station in which the terminal device is registered", a "base station that is used by the terminal device", or a "base station to which the terminal device belongs". "#A" denotes the base station device 10a, "#B" denotes the base station device 10b, "#C" denotes the base station device 10c, and "#D" denotes the base station device 10d. For example, "#A", that is, the base station device 10a is associated with the terminal device 20a-1. The example represented in FIG. 4 represents that the terminal device 20a-1, the terminal device 20a-2, the terminal device 20a-3, and the terminal device 20a-4 are connected to the base station device 10a. The example represents that the terminal device 20b-1, the terminal device 20b-2, and the terminal device 20b-3 are connected to the base station device 10b. The example represents that the terminal device 20c-1, the terminal device 20c-2, and the terminal device 20c-3 are connected to the base station device 10c. The example represents that the terminal device 20d-1, the terminal device 20d-2, and the terminal device 20d-3 are connected to the base station device 10d.

"The registration state" is information indicating the state of the terminal device. When the "registration state" is "registered", it is indicated that the location registration of the terminal device is performed and the power of the terminal device is on. When the "registration state" is "unregistered", it is indicated that, after the location registration of the terminal device was performed, the power of the terminal device got turned off. The example represented in FIG. 4 represents that the terminal device 20a-4 is "unregistered" and each of other terminal devices is "registered". When the user performs an operation for turning off the power of a terminal device, a request to delete location registration is transmitted from the terminal device to the base station device and the "registration state" is turned from "registered" to "unregistered". In other words, after the location registration of a terminal device is performed, when the power of the terminal device is turned off, the terminal device enters the "unregistered" state. When the processing part 32 gives registration permission to a location registration request that is received from the base station device 10 and registration in the terminal device database 331 is initially performed, the default value of the registration state is "registered" because it is clear that the power of the terminal device 20 having transmitted the location registration request is on.

Note that the base station device 10 or the management device 30 acquires the location information on each terminal device 20 and, when the location of the terminal device 20 turns to be outside the communication area of the base station device 10 (when the location of the terminal device 20 is in an area outside the network), the registration state may be turned to "unregistered". Specifically, using a global positioning system (GPS) function that each terminal device 20 has, the terminal device 20 preferably acquires location information on the terminal device 20 and transmits the location information from the terminal device 20 to the base station device 10 at a given cycle. The base station device 10 transmits the location information to the management device 30. The management device 30 stores information on the communication area of each base station device 10 (the range of latitude and longitude) and determines whether the location of the terminal device 20 is within the communication area and, when the location is turned to be outside the communication area, or is expected to be outside the communication area, turns the registration state to "unregistered". Furthermore, when new location information on the terminal device 20 is acquired, the management device 30 may determine whether the location is within the communication area and, when the location is within the communication area, turn the registration state of the terminal device 20 that was set as "unregistered" once to as "registered". Each base station device 10 may store information on the communication area of the base station device 10, determine whether the location of the terminal device 20 is within the communication area, and transmit the result of determination to the management device 30. The management device 30 may change the registration state based on the received result of determination.

When the registration state (registration information) is "registered", the terminal device 20 is in a state of being able to receive communication. Thus, the terminal device 20 is in a state of being able to receive a group participation request and is in a state of being able to participate in group communication. On the other hand, when the registration state (registration information) is "unregistered", the terminal device 20 is in a state of being unable to receive communication and thus is in a state of being unable to receive a group participation request and in a state of being unable to participate in group communication. The registration information can be referred to as information indicating whether or not the terminal device 20 is in a state of being able to perform reception.

Figure 5:
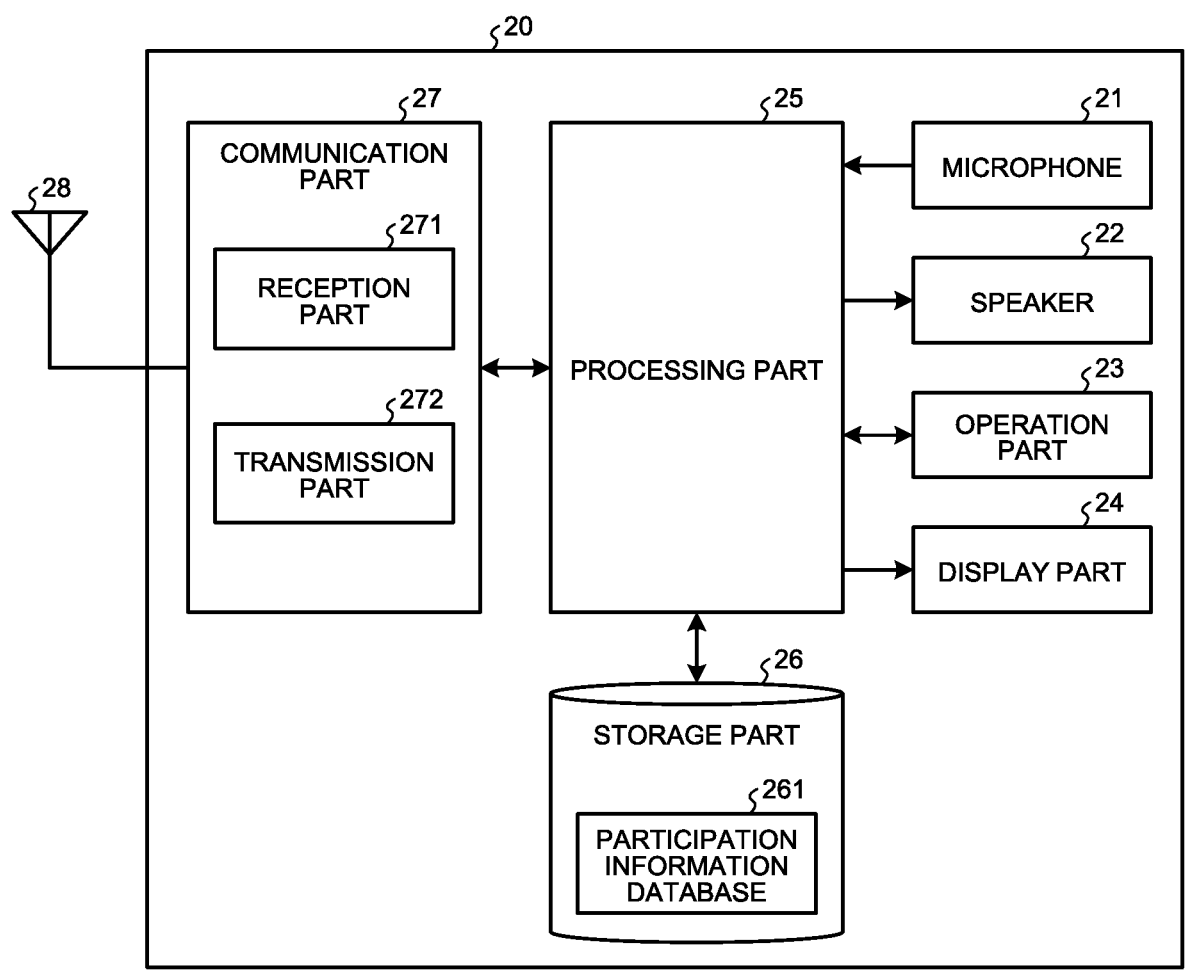
FIG. 5 is a block diagram illustrating an exemplary configuration of a terminal device according to the embodiment of the disclosure.

With reference to FIG. 5, an explanation will be given of the configuration of each terminal device 20 according to this embodiment of the present invention. FIG. 5 is a block diagram illustrating an example of the configuration of the terminal device 20 according to this embodiment of the present invention.

The terminal device 20 includes a microphone 21, a speaker 22, an operation part 23, a display part (also referred to a display) 24, a processing part (also referred to a processor) 25, a storage part 26, a communication part 27, and an antenna 28. The communication part 27 includes a reception part (also referred to a receiver) 271 and a transmission part (also referred to a transmitter) 272.

In the case of group communication, the microphone 21 receives voice from the user, and converts the voice into an audio signal. The microphone 21 outputs the audio signal to the processing part 25.

In the group communication, the speaker 22 receives an audio signal from the processing part 25, and outputs the audio signal as voice. Here, the speaker 22 may output a warning sound or the like.

The operation part 23 includes a button, a touch panel, and so forth, and receives an input from the user. The operation part 23 outputs the received input to the processing part 25.

The display part 24 receives an image (also referred to a diagram or display data) and a message from the processing part 25, and displays them. Where a face of a display is formed of a touch panel, the display part 24 is integrated with the operation part 23. However, the display part 24 may be not included in the terminal device 20. For example, an external display part (not illustrated) may be connected to the terminal device 20 to display information on the display part thus connected.

When the power of the terminal device 20 is turned on or when the terminal device 20 enters a new area, the processing part 25 generates a location registration request and a group registration request, and causes transmission part 272 to transmit the location registration request and the group registration request.

The transmission part 272 transmits the location registration request and the group registration request to the base station device 10 through an uplink control channel, under the control of the processing part 25. After the transmission part 272 performs the transmission through the uplink control channel, the reception part 271 receives a response to the location registration request and a response to the group registration request through a downlink control channel from the base station device. Upon reception of a call-origination request from the base station device 10, the reception part 271 outputs this request to the processing part 25. On the basis of the call-origination request, the processing part 25 judges whether the group is corresponding to the request to be received. Upon reception of group participation information from the base station device 10, the reception part 271 outputs this information to processing part 25. The processing part 25 stores group participation information on each terminal device into the storage part 26. The storage part 26 stores the group participation information on each terminal device as a participation information database 261.

Figure 9:
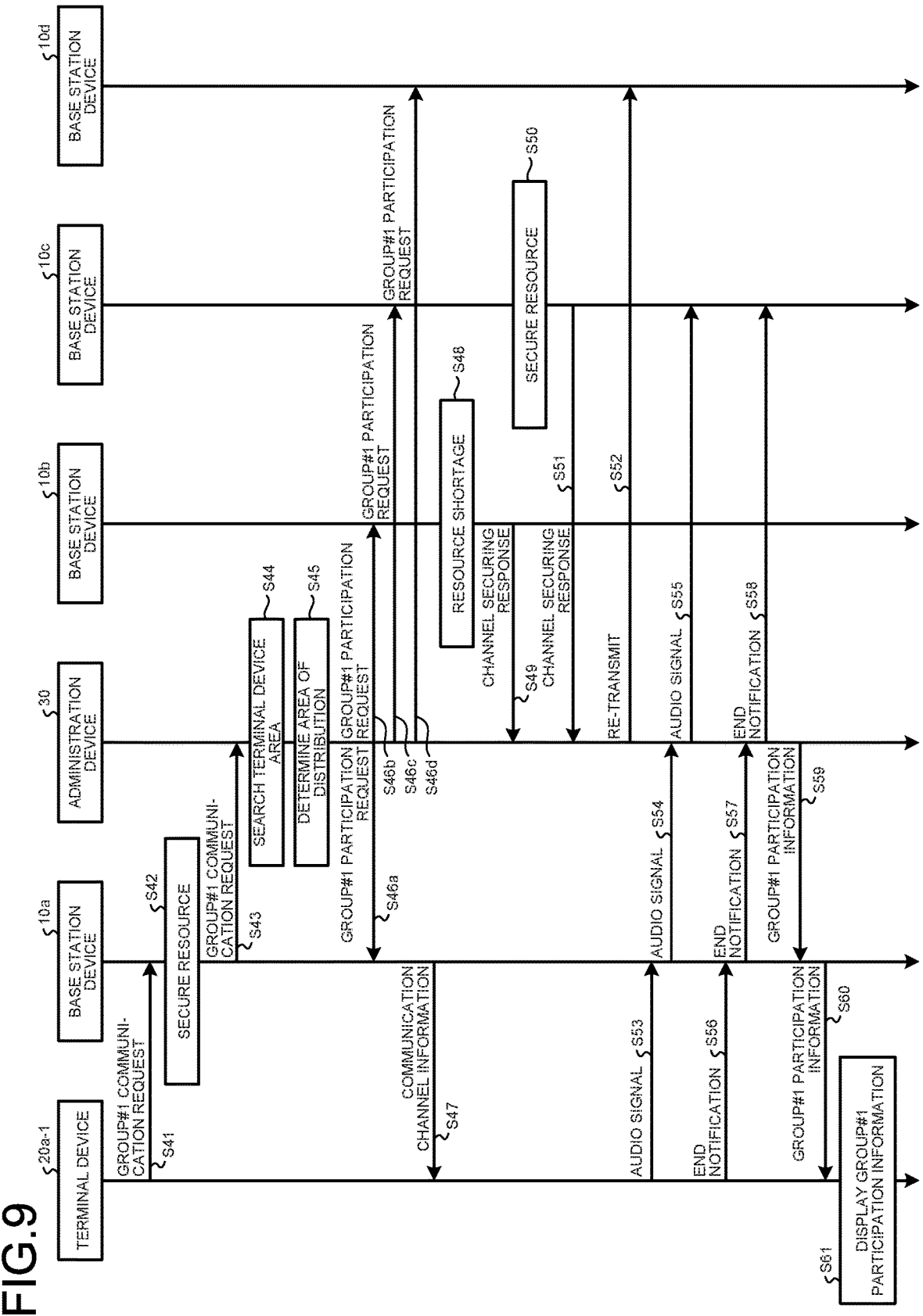
FIG. 9 is a sequence chart illustrating an exemplary flow of processes performed by devices, respectively, in group communication according to the embodiment of the disclosure.

With reference to FIG. 6, an explanation will be given of the participation information database 261. FIG. 6 is a diagram illustrating an example of the data structure of the participation information database 261. FIG. 9 is a diagram illustrating examples of the second terminal database 332 registered in the storage part 33. On receiving the group participation information from the management device 30 via the base station device 10, the terminal device 20 stores the group participation information as the participation information database 261 in the storage 26. The method in which the management device 30 creates group participation information (communication result information) will be described later.

As illustrated in FIG. 6, in the participation information database 261, a "terminal device ID", a "user ID", a "base station ID" and "participation information" are associated with one another. In other words, a "user ID", a "base station ID" and each field of "participation information" are stored per terminal device. FIG. 6 represents participation information generated when group communication (one group communication) of "group #1" is executed. FIG. 6 represents the participation information database 261 that is stored in the terminal device 20a-1 serving as a call-origination terminal of the group communication and in which information on the terminal device 20a-1 is not contained. As described above, the participation information database 261 need not contain information on the call-origination terminal but the participation information database may contain the information on the call-origination terminal. When one terminal device 20 belongs to multiple groups, the participation information database 261 is preferably stored in the storage 26 part in association with the group ID. In other words, the participation information database 261 may be stored per group. FIG. 6 represents the participation information database 261 in one group communication and alternatively the participation information database 261 may be stored in the storage part 26 in association with an ID (communication ID) that identifies the communication. In other words, the participation information database 261 relating to multiple group communications may be stored.

The "participation information" field stores information (value), such as "participation", "power off", and "network fault". The "participation information" field is information indicating the status of the terminal device 20 in participating in the group communication. The "participation information" field is information indicating whether the terminal device 20 at least participates in the group communication. The "participation information" field is information indicating, when the terminal device 20 does not participate in the group communication, which of three factors of "power off", "resource shortage" "network fault" is the cause.

"Participation" means that the terminal device 20 participates in group communication. When a call-origination request for starting group communication is transmitted from the call-origination terminal device by an operation of the user of the call-origination terminal device, all call-destination terminals are not necessarily able to participate in the group communication. For example, a call-destination terminal device whose power is off or a call-destination terminal device that is registered in the base station device that has failed to secure a resource are unable to participate in group communication. In other words, a terminal device whose corresponding "participation information" field is "participation" is, among the terminal devices to be called, a terminal device on which the call process has been executed normally and to which information, such as a communication voice or text messages, is transmitted from the call-origination terminal device. The example illustrated in FIG. 6 represents that the terminal device 20a-2, the terminal device 20c-1, the terminal device 20c-2, and the terminal device 20c-3 participate in the group communication.

The "power off" means that the power of the terminal device 20 was in an off-state and thus participation in the group communication was not possible. In the example illustrated in FIG. 6, it is shown at the terminal device 20a-4 that the power was in an off-state.

The "resource shortage" means a state where the base station device 10 was in resource shortage and thus participation in the group communication was not possible. For example, this is a status where "the base station device 10 was short of communication channel", "the base station device 10 was short of processing capacity, such as that of the CPU or memory", "the base station device 10 exceeded the available power amount", or the like. In the example illustrated in FIG. 6, it is shown at the terminal device 20b-1, the terminal device 20b-2, and the terminal device 20b-3, that the base station device 10 was in resource shortage and thus participation in the group communication was not possible.

The "network fault" means a state where the network between the management device 30 and the base station device 10 was in a disconnected state and thus participation in the group communication was not possible. In the example illustrated in FIG. 6, it is shown, at the terminal device 20d-1, the terminal device 20d-2, and the terminal device 20d-3, that there was a network fault between the base station device 10d and the management device 30 and thus participation in the group communication was not possible.

Process in Radio Communication System

Figure 7:
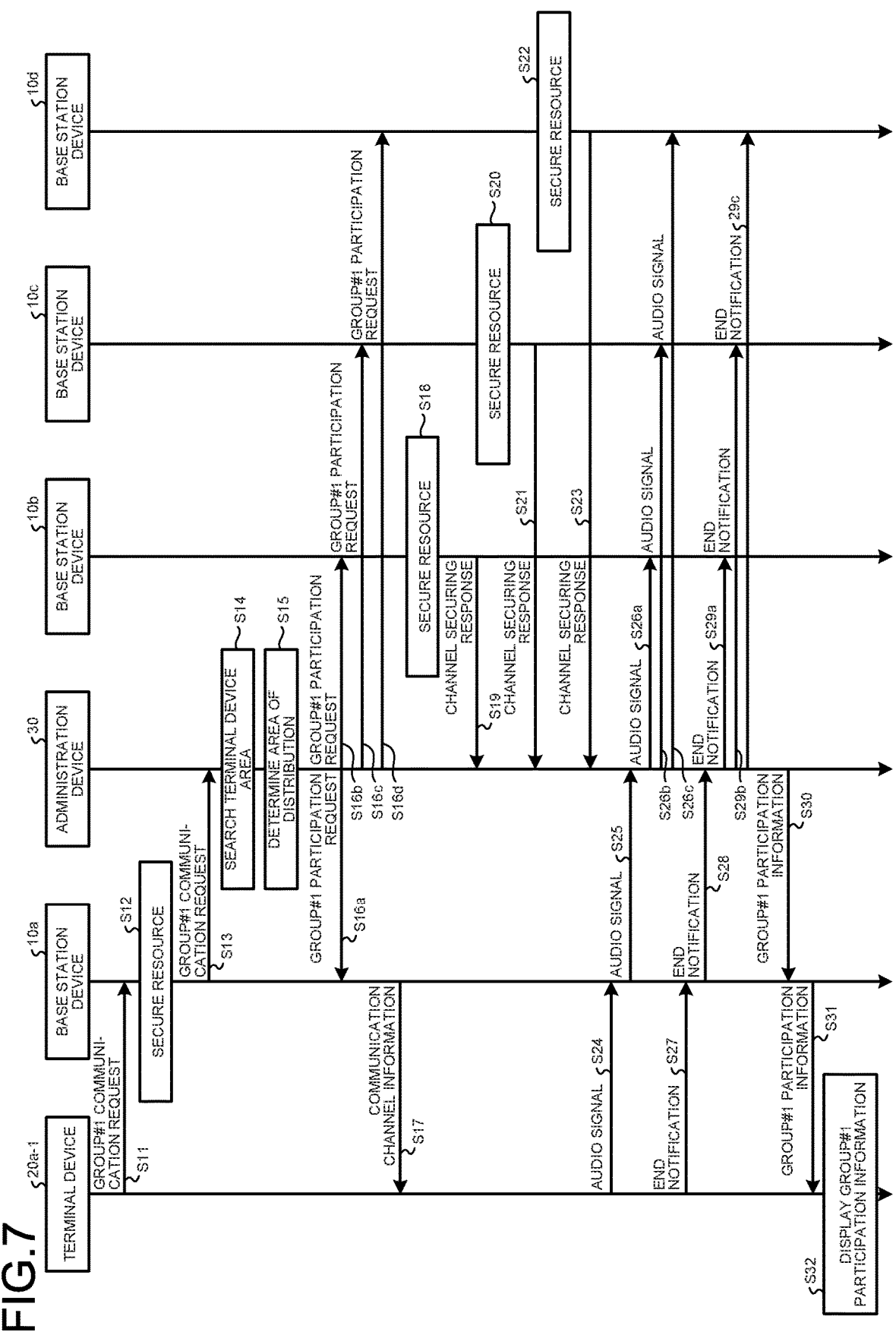
FIG. 7 is a sequence chart illustrating an exemplary flow of processes performed by devices, respectively, in group communication according to the embodiment of the disclosure.

With reference to FIG. 7, an explanation will be given of a process in group communication according to this embodiment of the present invention. FIG. 7 is a sequence diagram illustrating an example of a process flow in respective devices in group communication according to this embodiment of the present invention. In FIG. 7, the terminal device 20a-1 serves as a call-origination terminal device that makes a call for group communication.

First of all, the terminal device 20a-1 transmits a communication request for "Group#1" on an uplink control channel (step S11). In FIG. 7, a group communication by voice call is assumed as group communication and thus the term "speech-communication-origination request" is used; however, as described above, this has the same meaning as that of "call-origination request".

On receiving the group communication request from the terminal device 20a-1, the base station device 10a secures a resource (communication channel) (step S12). On securing the resource, the base station device 10a transmits the speech-communication-origination request for "Group#1" to the management device 30 (step S13).

The management device 30 searches the terminal device database 331 for areas where there are terminal devices (other than the call-origination terminal device) that belong to "Group#1" (step S14). The management device 30 determines a distribution area based on the search result at step S14 (step S15).

The management device 30 transmits a request to participate in "Group#1" to the base station device 10a, the base station device 10b, the base station device 10c and the base station device 10d (step S16a, step S16b, step S16c and step S16d). The base station device 10a transmits communication channel information to the terminal device 20a-1 (step S17).

On receiving the request to participate in "Group#1", the base station device 10b secures a resource (communication channel) (step S18). Upon securing a resource, the base station device 10b transmits a channel securing response (success) to the management device 30 (step S19). Note that, when the base station device 10 fails to secure a resource, the base station device 10 transmits a channel securing response (failure) to the management device 30. The channel securing response (success) and the channel securing response (failure) can be also collectively referred to as resource securing information or resource information. The acquisition part 34 of the management device 30 acquires the resource securing information from the base station device 10 via the network IF unit 31.

On receiving the request to participate in "Group#1", the base station device 10c secures a resource (communication channel) (step S20). On securing a resource, the base station device 10c transmits a channel securing response (success) to the management device 30 (step S21).

On receiving the request to participate in "Group#1", the base station device 10d secures a resource (communication channel) (step S20). On securing a resource, the base station device 10d transmits a channel securing response (success) to the management device 30 (step S23). At step S19, step S21 and step S23, the resource securing information (channel securing response) that is acquired by the acquisition part 34 is information indicating the operational state of the base station device 10 and thus can be also referred to as operational information on the base station device. The operational information on the base station device can be also referred to as "base station operational information" or "base station information". The base station operational information is information indicating at least whether the operation of the base station device 10 is "normal" or "abnormal". The channel securing response (success) corresponds to base statin operational information "success" and the channel securing response (failure) corresponds to base station operational information "abnormal".

Then, according to the channel information of which the terminal device 20a-1 is notified at step S17, the terminal device 20a-1 transmits an audio signal to the base station device 10a (step S24). The base station device 10a transmits the audio signal that is received from the terminal device 20a-1 to the management device 30 (step S25). The management device 30 transmits the audio signal that is received from the base station device 10a to the base station device 10b, the base station device 10c, and the base station device 10d (step S26a, step S26b and step S26c).

When the communication of "Group#1" ends, the terminal device 20a-1 transmits an end notification to the base station device 10a (step S27). The base station device 10a transmits the end notification that is received from the terminal device 20a-1 to the management device 30 (step S28). The management device 30 transmits the end notification that is received from the base station device 10a to the base station device 10b, the base station device 10c, and the base station device 10d (step S29a, step S29b and step S29c).

The management device 30 then creates group participation information (communication result information). The acquisition part 34 refers to the terminal device database 331 of the storage part 33 and acquires all data relating to the group ("Group#1" here) to be an object of the group communication. For example, in the example illustrated in FIG. 4, the data relating to "Group#1" is all data excluding data whose corresponding terminal device ID is "#20a-3" and thus those all data is acquired. In other words, the acquisition part 34 acquires terminal device IDs, user IDs, base station IDs, and registration information corresponding to a given group from the terminal device database 331 (storage part 33). The data that is acquired by the acquisition part 34 from the storage part 33 contains information (registration information) indicating whether the terminal devices 20 are able to perform reception, that is, the state of (operational information on) the terminal devices 20 during group communication and thus can be referred to as operational information on the terminal devices. The operational information on the terminal devices is also referred to as "terminal device operational information", "terminal device state information" or "terminal information". Note that the data that is stored in the terminal device database 331 is data (terminal device IDs, user IDs, group IDs, and base station IDs) that is acquired by the management device 30 from the base station devices 10 and data (registration state) that is created based on the data (base station device IDs) that is acquired by the management device 30 from the base station devices 10 and thus, in other word, the acquisition part 34 acquires terminal device operational information necessary to create group participation information from the base station devices 10. Based on the data that is acquired by the acquisition part 34 from the storage and the resource securing information that is acquired by the acquisition part 34 at step S19, step S21 and step S23, the processing part 32 creates group participation information. The group participation information contains the same information as that in the participation information database 261 represented in FIG. 6. In other words, the group participation information (communication result information) contains the terminal device IDs, the user IDs, the base station IDs, and the participation information. Note that the user IDs may be omitted.

The processing part 32 sets the content (values) of the "participation information" field of the group participation information as follows.

(1) A terminal device 20 which is "registered" in the data acquired by the acquisition part 34 from the terminal device database 331 and belongs to the base station 10 from which a channel securing response (success) is acquired by the acquisition part 34 is treated to set the participation information on this terminal as "participation". In other words, the participation information on a terminal device 20 which belongs to the base station 10 where no fault occurs during group communication and which was in a state capable of receiving the group communication is set as "participation".

(2) A terminal device 20 which is "unregistered" in the data acquired by the acquisition part 34 from the terminal device database 331 is treated to set the participation information on this terminal device 20 as "power off". Further, when the management device 30 can recognize that a terminal device 20 is located in an area outside the communication service range during the group communication, the participation information on this terminal device 20 may be set as "out of range". Further, the "power off" and the "out of range" may be collectively set as "non-participation" in the participation information. Thus, the participation information on each terminal device 20, which was in a reception impossible state during the group communication, may be set as "non-participation".

(3) A terminal device 20 which belongs to the base station 10 from which a channel securing response (failure) is acquired by the acquisition part 34 at step S19, step S21 and step S23 is treated to set the participation information on this terminal as "resource shortage".

(4) When the acquisition part 34 cannot acquire a channel securing response within a predetermined time at step S19, S21 and S23, there is a high possibility of a network fault between the base station device 10, which should originally transmit the channel securing response, and the management device 30. Accordingly, the participation information on a terminal device 20 belonging to this base station device 10 is set as "network fault" by the processor 32. When the terminal device 20 does not participate in the group communication, any one of "power off", "resource shortage" and "network fault" is set as the factor in the participation information field. Of these indications of the participation information, the "power off" is a factor on the terminal device 20 side and the rest two of the "resource shortage" and the "network fault" are factors on the base station device 10 side. The factor on the terminal device 20 side is also referred to the factor related to the terminal device 20. Specifically, the factor on the call-destination terminal device side is also referred to the factor related to the call-destination terminal device. The factors on the base station device 10 side are also referred to the factors related to the base station device 10. When the group participation request (data) is not transmitted from the base station device 10 to the terminal device 20, any one of the two factors ("resource shortage" and "network fault") is set in the participation information field as the factor.

In the example of the sequence chart illustrated in FIG. 7, no event corresponding to (3) and (4) above occurs and thus "participation" or "power off (non-participation)" is set for the participation information.

The base station device 10a is notified of a participation area with an object for the group communication and participation information on the terminal devices as "Group#1" participation information (group participation information) (step S30). The base station device 10a transmits the "Group#1" participation information that is received from the management device 30 to the terminal device 20a-1 (step S31). The terminal device 20a-1 displays the "Group#1" participation information that is received from the management device 30 on the display part 24 (step S32). A method of displaying the "Group#1" participation information will be described below. The process in FIG. 7 ends.

At step S31, the base station device 10a may transmit the group participation information to not only the terminal device 20a-1 but other terminal devices. For example, the base station device 10a may transmit the group participation information to all terminal devices in the same group registered in the base station device 10a. Alternatively, at step S30, the management device 30 may transmit the group participation information to base station devices other than the base station device 10a. In this case, each base station device 10 in the same group may transmit the group participation information to the terminal devices that are registered in the same group. The management device 30 may transmit the group participation information to terminal devices (management terminal devices) or other devices not depending on whether the device belongs to the group. For example, the management device 30 may transmit the group participation information to the terminal device (management terminal) that is used by the administrator who administers the communication system.

The management device 30 may transmit the group participation information not after the group communication ends but at earlier timing. For example, the management device may create and transmit group participation information right after receiving the channel securing response (success) or the channel securing response (failure) from each base station device. The management device 30 may create and transmit group participation information at any timing after reception of the channel securing response (success) or the channel securing response (failure) until when the group communication ends.

Radio Communication System

Figure 8:
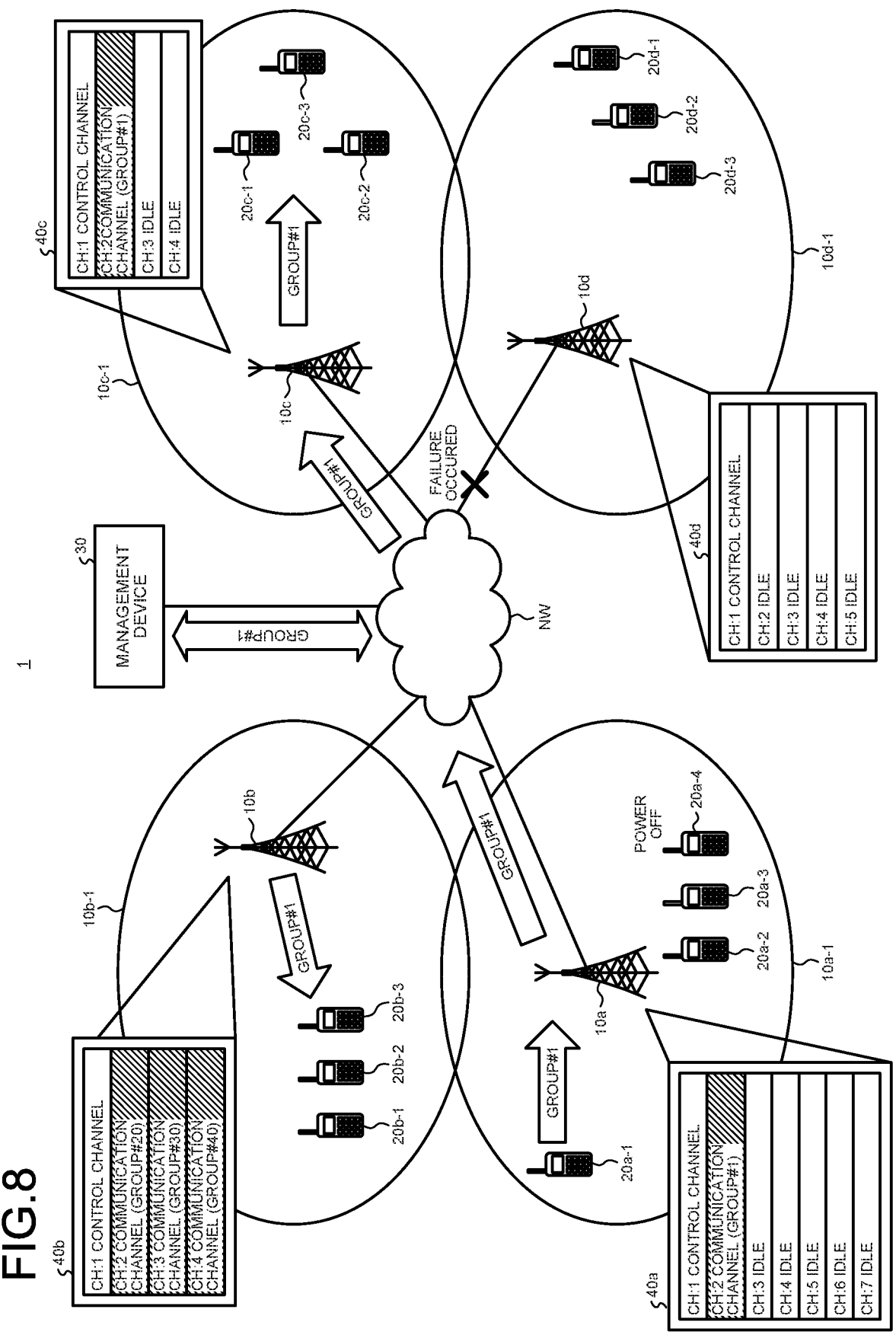
FIG. 8 is a schematic diagram illustrating a configuration of a radio communication system according to an embodiment of the disclosure.

With reference to FIG. 8, operations of the radio communication system 1 according to the embodiment of the disclosure will be further described. FIG. 8 is a schematic diagram for explaining operations of the radio communication system 1 according to the embodiment of the disclosure.

The operational status of the radio communication system 1 is different between the example illustrated in FIG. 8 and the example illustrated in FIG. 1. For example, the number of channels used by the base station device 10b differs.

In FIG. 8, the terminal device 20a-3 in the communication area 10a-1 does not belong to "Group#1" and belongs to "Group#1000". The terminal device 20a-4 that belongs to "Group#1" is powered off.

Referring to the channel information 40b of the base station device 10b, the communication channel of "Group#20" is used for CH2, the communication channel of "Group#30" is used for CH3, and the communication channel of "Group#40" is used for CH4. In other words, a resource for group communication of "Group#1" is short.

In the communication area 10d-1 of the base station device 10d, a failure has occurred in the network that connects the base station device 10d and the management device 30.

The processes in the radio communication system 1 under the circumstances in which a group communication cannot be executed normally as illustrated in FIG. 8 will be described below.

Processes in Radio Communication System

With reference to FIG. 9, the process of group communication according to the embodiment of the disclosure will be described. FIG. 9 is a sequence chart illustrating an exemplary flow of processes performed by the devices, respectively, in a group communication according to the embodiment of the disclosure. In FIG. 9, the terminal device 20a-1 serves as a call-origination device that originates a call for group communication.

In FIG. 9, steps S41 to S47 are the same as steps S11 to S17 illustrated in FIG. 7 and thus description thereof will not be given.

On receiving a request to participate in "Group#1", the base station device 10b determines that there is a resource (communication channel) shortage (step S48). When it is determined that there is a resource shortage, the base station device 10b transmits a channel securing response (failure) to the management device 30 (step S49). Here, information of the channel securing response (failure) of which the management device 30 is notified is also referred to as operational information on the base station device or base station operational information as described above. The acquisition part 34 of the management device 30 acquires the channel securing response (failure) from the base station device 10 via the network IF unit 31. In other words, the acquisition part 34 acquires the base station operational information.

On receiving a request to participate in "Group#1", the base station device 10c secures a resource (communication channel) (step S50). On securing the resource, the base station device 10c transmits a channel securing response (success) to the management device 30 (step S51).

As described above with reference to FIG. 8, there is the situation in which a failure has occurred in the network between the management device 30 and the base station device 10d. For this reason, the management device 30 is unable to receive a channel securing response from the base station device 10d. In this case, when the management device 30 is unable to receive a channel securing response within a given time (a first given time, for example, 10 seconds), the management device 30 transmits a group participation request again (step S52). When the acquisition part 34 is unable to receive a channel securing response within a given time (a second given time, for example, 20 seconds) after the re-transmission, the acquisition part 34 determines that a failure has occurred in the network between the management device 30 and the base station device 10d. The first given time and the second given time may be equal to each other or different from each other. The re-transmission process may be omitted and, when a channel securing response cannot be received within the given time after a group participation request is transmitted for the first time, it may be determined that a network fault has occurred. In other words, when it is detected that a channel securing response cannot be acquired, the acquisition part 34 acquires base station operational information indicating that the base station device 10 or the network NW is "abnormal". In contrast, when a channel securing response is acquired within the given time, the acquisition part 34 acquires base station operational information indicating that the network NW is "normal". The case where group participation requests are re-transmitted for a given time has been described as the method of determining a failure in the network between the management device 30 and the base station device 10d; however, the disclosure is not limited thereto. For example, the management device 30 and the base station device 10d may mutually confirm their presence (confirm the normal operations on the network) and determine a network fault based on the confirmation. When there is a failure in the network between the management device 30 and the base station device 10, the base station device 10 is naturally unable to execute normal operations and thus acquisition (detection) of information on the network fault by the acquisition part 34 corresponds to acquisition of base station device information. The term, network fault, covers not only faults in the network NW but also faults in the network IF unit 14 of the base station device 10 and faults in the base station device 10 in communicating with the management device 30. As the base station device 10 is unable to execute normal operations when a network fault occurs, a network fault can be also referred to as a failure relating to the base station device 10. In other words, "resource shortage" and "network fault" in the "participation information" field indicate that a failure relating to the base station device 10 has occurred.

According to the communication channel information that is received at step S47, the terminal device 20*a*-1 transmits an audio signal to the base station device 10*a* (step S53). The base station device 10*a* transmits the audio signal that is received from the terminal device 20-1 to the management device 30 (step S54). The management device 30 transmits the audio signal that is received from the base station device 10*a* to the base station device 10*c* (step S55). In other words, the audio signal from the terminal device 20*a*-1 is transmitted to only the base station device 10*c*.

When ending the communication of "Group#1", the terminal device 20*a*-1 transmits an end notification to the base station device 10*a* (step S56). The base station device 10*a* transits the end notification that is received from the terminal device 20*a*-1 to the management device 30 (step S57). The management device 30 then transmits the end notification that is received from the base station device 10*a* to the base station device 10*c* (step S58).

The management device 30 creates group participation information (communication result information). Specifically, as described above, the acquisition part 34 and the processing part 32 perform a cooperative process and create the group participation information based on the base station operational information and the terminal device operational information. In the example illustrated in FIG. 9, at step S49, the acquisition part 34 acquires a channel securing response (failure) from the base station device 10*b* and thus this corresponds to the case (3) described above and the participation information on the terminal device 20 that belongs to the base station device 10*b* is "resource shortage". At step S52, the acquisition part 34 is unable to acquire a channel securing response from the base station device 10*d* within the given time and thus this corresponds to the case (4) described above and the participation information on the terminal device 20 that belongs to the base station device 10*d* is "network fault". In the example illustrated in FIG. 9, after creating "Group#1" participation information (group participation information), the management device 30 notifies the base station device 10*a* of the participation information (step S59). The base station device 10*a* transits the "Group#1" participation information that is received from the management device 30 to the terminal device 20*a*-1 (step S60). The terminal device 20*a*-1 displays the "Group#1" participation information that is received from the management device 30 on the display part 24 (step S61). The method of displaying the "Group#1" participation information will be described later. The process of FIG. 9 then ends.

The timing at which the management device 30 transmits group participation information may be any timing at and after the start of group communication. In other words, group participation information may be transmitted while the group communication is ongoing or may be transmitted after the group communication ends.

The purpose of displaying group participation information on the terminal device 20*a*-1 will be described.

In the radio communication system 1, for example, in the case where "Group#1" is registered in only the base station device 10*a* in the management device 30, when a "Group#1" communication occurs, the communication within the base station device 10*a* is carried out. For this reason, a set of channels of only the single base station device 10 is used.

In the case where "Group#1" is registered in two sets of base station device 10 (for example, the base station device 10*a* and the base station device 10*b*), when a communication of "Group#1" occurs, a set of channels are used in each of the base station device 10*a* and the base station device 10*b*. In other words, two sets of channels are used in the communication system as a whole.

When "Group#1" is registered in three sets of base station device 10 (for example, the base station device 10*a*, the base station device 10*b*, and the base station device 10*c*) or more, three or more sets of channels are consumed in the communication system as a whole. When all channels of the base station device 10*b* are used by another group, a communication of "Group#1" is not distributed to the base station device 10*b*. This is the situation in which the base station device 10*b* is "busy". For this reason, each terminal device that belongs to the area of the base station device 10*b* is unable to receive the communication of "Group#1". With the conventional technique, the user of a call-origination terminal device is unable to know occurrence of such a situation. Accordingly, the user of the call-origination terminal device may misunderstand that the content of the call made by the user (call-origination information) has reached all users in the group. According to the embodiment, after the communication ends or during the communication, the call-origination terminal device is notified of participation information on the terminal devices that belong to the group. This allows the user of the call-origination terminal device to know easily information on whether the call-origination information has assuredly reached another user and, when the call-origination information has not reached, why and whom the information has not reached.

Participation Display of Group Participation Information

Figure 10:
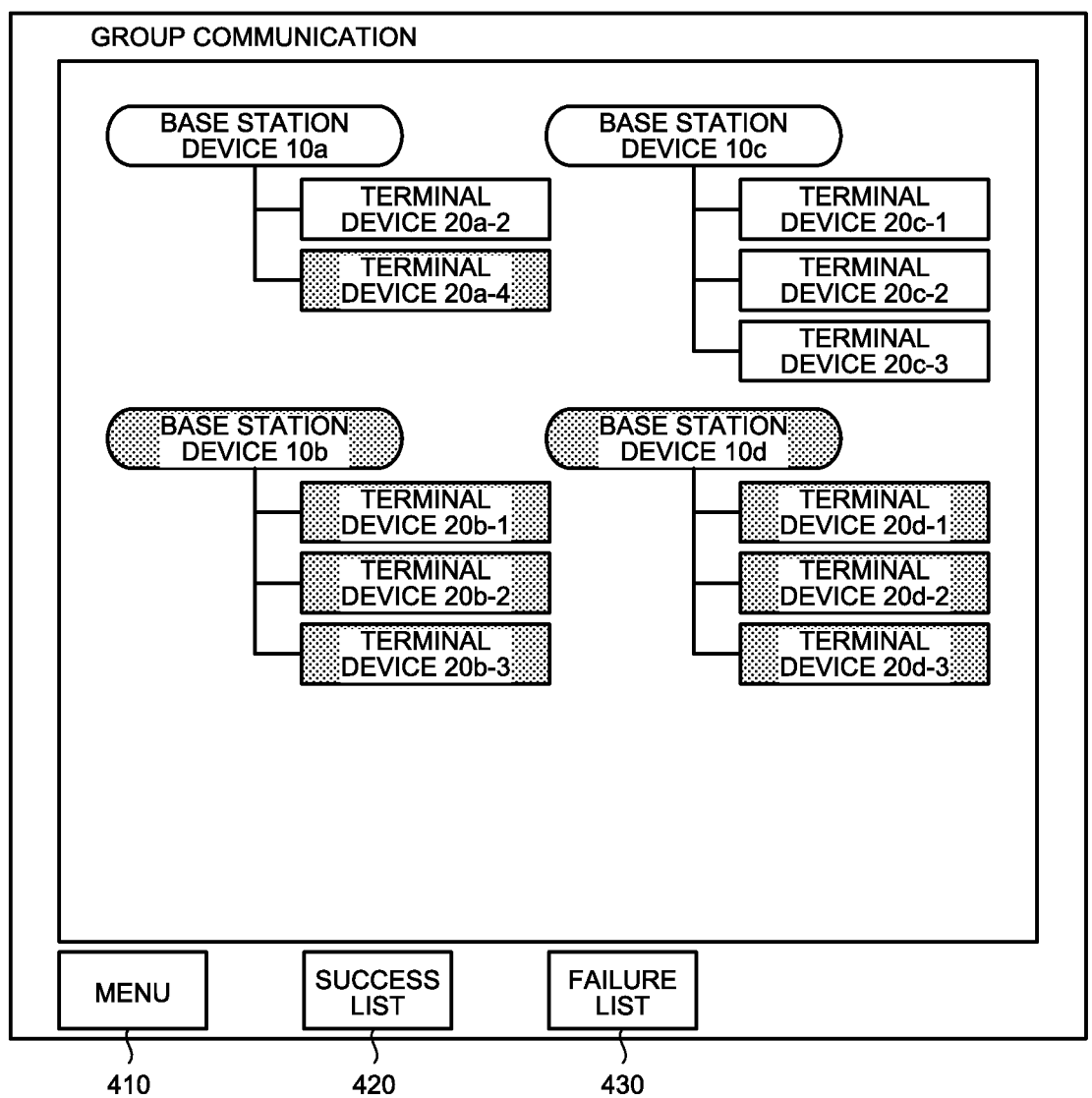
FIG. 10 is a diagram illustrating an exemplary method of displaying group communication.

With reference to FIG. 10, exemplary group participation information that is displayed by the terminal device 20 will be described. FIG. 10 is a diagram illustrating an exemplary display of group participation information.

On the occasion when receiving the group participation information from the base station device 10, automatically, or by receiving a given operation of the user, the terminal device 20 displays the group participation information. Specifically, the processing part 25 of the terminal device 20 generates a screen of a list of group communication logs based on the group participation information that is stored in the participation information database 261 of the storage 26 and causes the display part to display the generated list screen.

FIG. 10 illustrates an exemplary screen that is displayed on the display part 24. On a display 400, the base station devices 10 (10*a*-10*d*) represented in FIG. 7 and the terminal devices 20 that belong to the base station devices 10 are displayed. The terminal devices 20 that belong to the base station devices 10 can be displayed in a list. It is displayed that the terminal device 20*a*-2 and the terminal device 20*a*-4 belong to the base station device 10*a*. It is displayed that the terminal device 20*b*-1, the terminal device 20*b*-2, and the terminal device 20*b*-3 belong to the base station device 10*b*. It is displayed that the terminal device 20*c*-1, the terminal device 20*c*-2, and the terminal device 20*c*-3 belong to the base station device 10*c*. It is displayed that the terminal device 20*d*-1, the terminal device 20*d*-2, and the terminal device 20*d*-3 belong to the base station device 10*d*. As described above, the corresponding relationship between the base station device 10 and the terminal device 20 is displayed on the screen and this allows the user to easily know the correspondence relationship among the base station devices 10 and the terminal devices 20. Each set of base station device and terminal devices that belong to the set of base station device are connected by lines; however, the mode of display is not limited thereto. For example, for each base station device, the base station device and terminal devices that belong to the base station device may be displayed such that they are surrounded by a diagram, such as a circle.

In FIG. 10, the base station ID or the base station name of the base station device 10 is displayed in the diagram corresponding to the base station device 10. Depending on the operational status of each base station device 10, the mode of display of the diagram changes. In the example illustrated in FIG. 10, the background color of the diagram of the base station device 10 in which no failure occurs is "white" and the background color of the diagram of the base station device 10 in which a failure occurs is "gray". In a column of each terminal device (a diagram corresponding to each terminal device), for example, a "terminal device ID" of each terminal device is displayed. Note that, not only the terminal device ID but the name of the terminal device (terminal device name) or the name of the user who uses the terminal device (user name) may be displayed. Depending on the status of each terminal device in participation in the group communication, the mode of display of the diagram corresponding to the terminal device varies. In FIG. 10, for example, the background color is displayed in white for a terminal device that participates in the group communication, and the background color is displayed in gray for a terminal device that does not participate in the group communication. In the example illustrated in FIG. 10, the background color of the base station device 10*a* is white, the background of the terminal device 20*a*-2 that belongs to the base station device 10*a* is white, and the background of the terminal device 20*a*-4 is gray. Such display allows the user to easily know that the cause of inability of the terminal device 20*a*-4 to participate in the group communication is not a problem resulting from the base station device 10*a* but a cause (for example, power off) resulting from the terminal device 20*a*-4. In other words, when no failure occurs in a base station device and parts of multiple terminal devices that belong to the base station device participate and the remaining terminal devices do not participate, the user is able to easily know that the terminal devices do not participate not due to a problem resulting from the base station device but due to a problem resulting from the terminal devices.

On the other hand, the background of the base station device 10*b*, the base station device 10*d*, and all the terminal devices that belong to the base station device 10*b* and the base station device 10*d* is displayed in gray. This indicates that each of the terminal devices was unable to participate in group communication due to a problem resulting from the base station device 10*b* and the base station device 10*d*.

The display 400 contains a menu button 410 that receives operations from the user, a success list button 420 and a failure list button 430. Choosing the menu button 410 enables display of various menu screens. The success list button 420 and the failure list button 430 will be described below.

Figure 11:
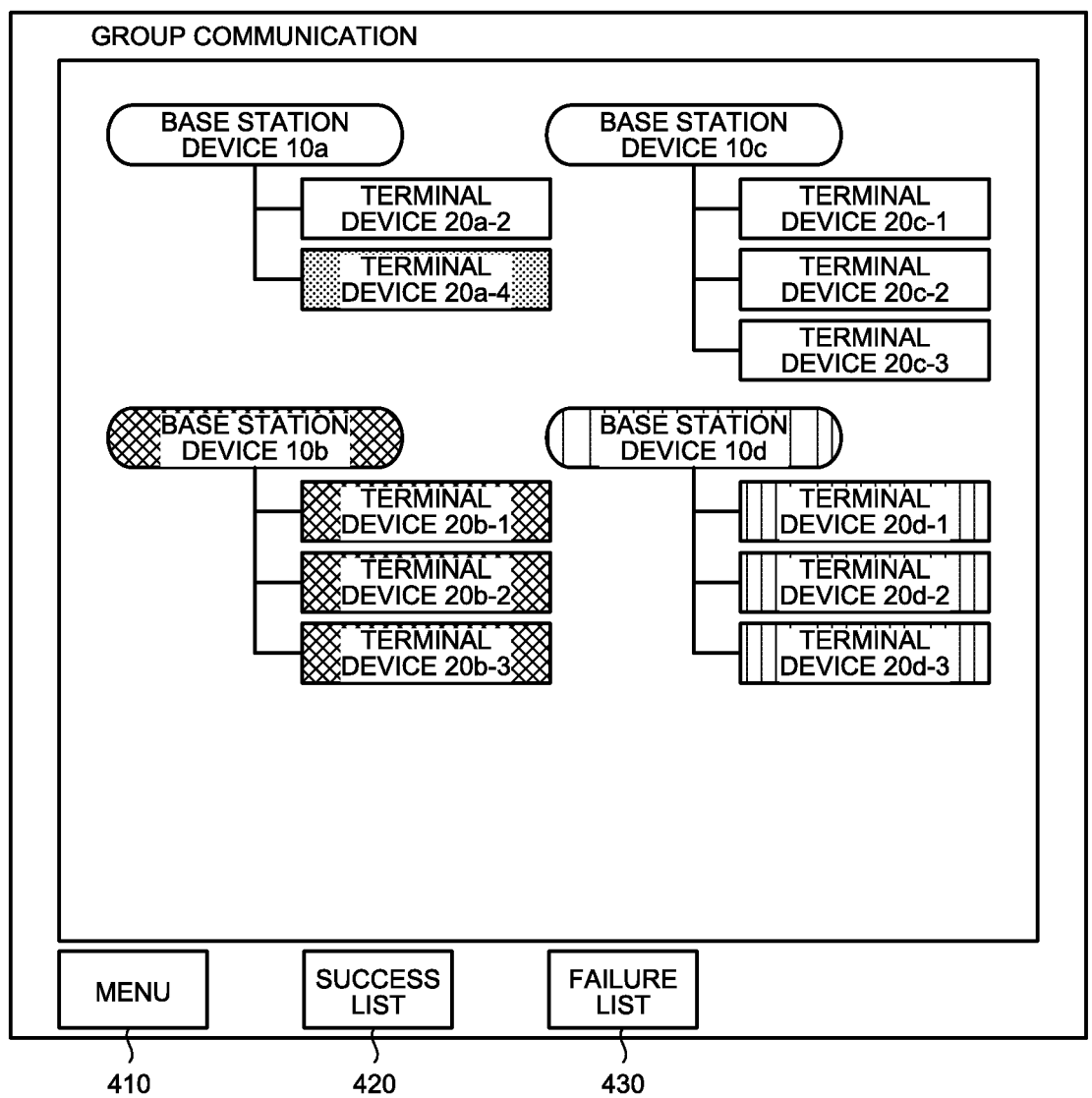
FIG. 11 is a diagram illustrating an exemplary method of displaying group communication.

FIG. 11 is a diagram illustrating another exemplary display of group participation information. In FIG. 11, compared to FIG. 10, more detailed information on base station devices are displayed.

On a display 400A illustrated in FIG. 11, the background of the base station device 10*b* and all the terminal device 20*b*-1, the terminal device 20*b*-2, and the terminal device 20*b*-3 that belong to the base station device 10*b* is displayed in a meshed (crosshatched) manner. The meshed background means that the group communication request was not distributed due to a resource shortage in the base station device 10*b*.

On the display 400A, the background of the base station device 10*d* and all the terminal device 20*d*-1, the terminal device 20*d*-2, and the terminal device 20*d*-3 that belong to the base station device 10*d* is displayed in a vertically-striped manner. The vertically-striped background means that the group communication request was not distributed due to a network fault relating to the base station device 10*d*. As described above, according to the detailed information (factor of the fault, or the like) on the base station device 10, the mode of display of the diagram illustrating the base station devices 10 varies.

By referring to the display 400A, the user is able to know that the base station device 10*b* did not distribute group participation information due to a resource shortage and that the base station device 10*d* did not distribute group participation information due to a network fault. When there are multiple problems resulting from terminal devices, the display of background of the terminal devices may be changed according to the problems.

On the display 400 or the display 400A, the user names of the users who use the terminal devices may be displayed. Such display enables display of a communication result to be more instinctively and easily understood. In this case, the user IDs that are stored in the participation information database 261 as represented in FIG. 6 are preferably displayed. On the display 400 or the display 400A, only "user IDs" may be displayed instead of "terminal device IDs" or both "terminal device IDs" and "user IDs" may be displayed. After the names of users (user names) who use the terminal devices are stored in the participation information database 261, the user names may be displayed on the display 400 or the display 400A.

As described above, it is preferable that terminal devices that has participated in group communication and terminal devices that does not participate in the group communication are displayed in different display modes (different display colors, display icons, different fonts and the like). Similarly, it is preferable that the base station devices that distributed group communication and the base station devices that did not distribute group communication are displayed in different display modes. Furthermore, when the group communication was not distributed, it is preferable that a diagram illustrating the terminal devices and the base station devices are displayed for each factor of the non-distribution of the group communication in different display modes. Such display can inform users of the terminal devices of the status of distribution of group communication very easily and instinctively understandably.

According to the embodiment, an operation from the user is received and accordingly the mode of display of group participation information is changed.

Figure 12:
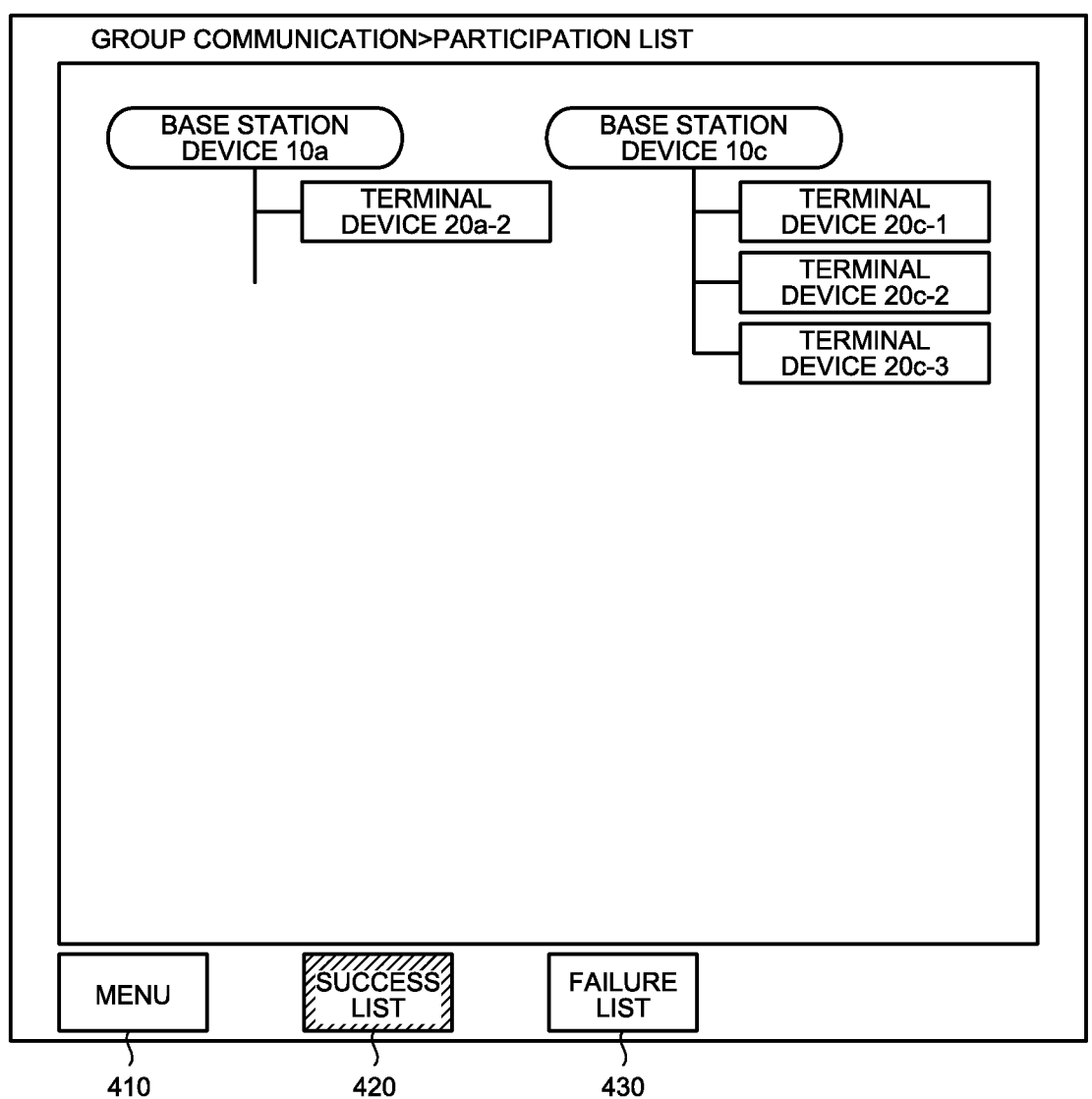
FIG. 12 is a diagram illustrating an exemplary method of displaying group communication.
Figure 13:
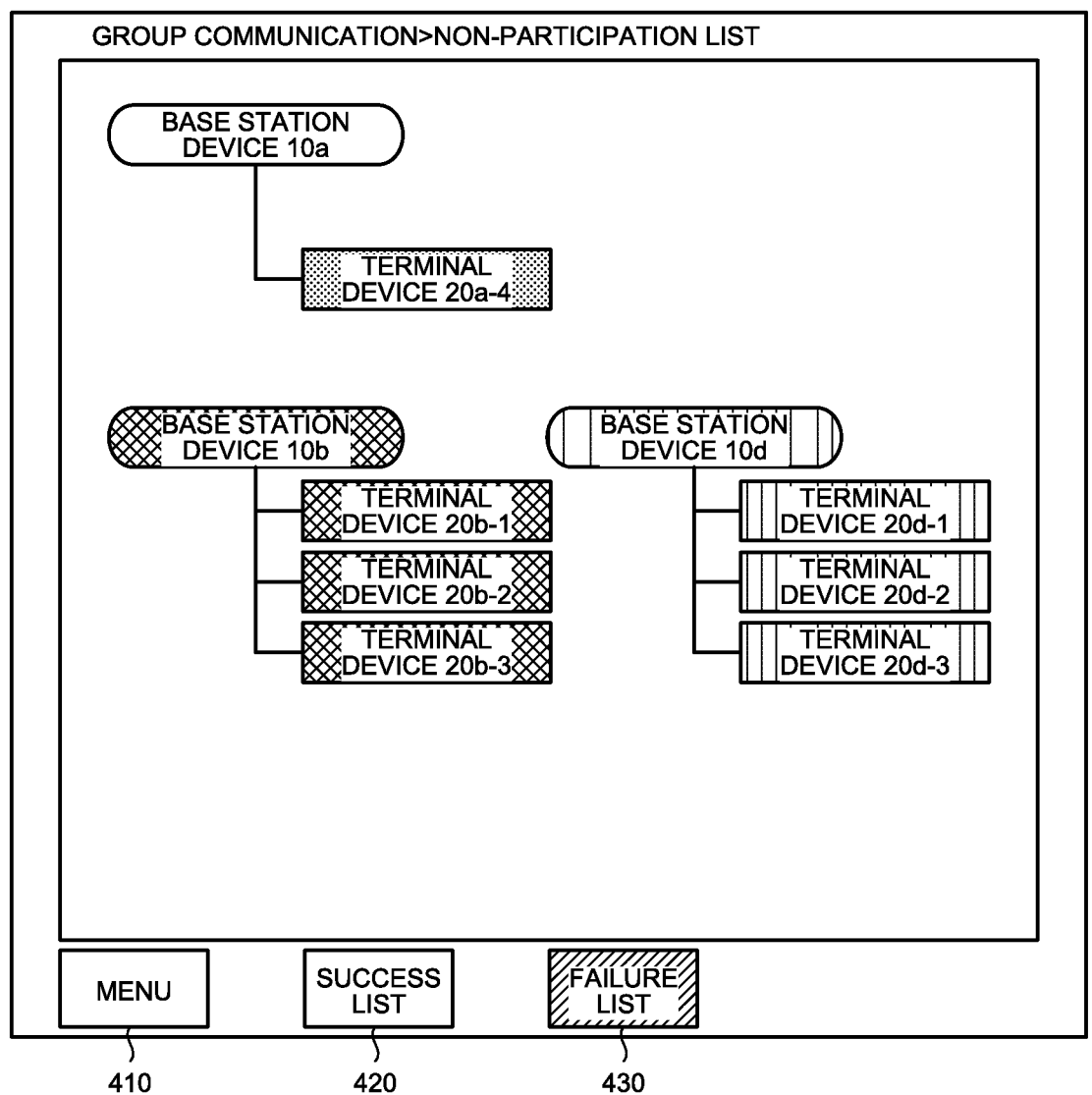
FIG. 13 is a diagram illustrating an exemplary method of displaying group communication.

Still other exemplary modes of displaying group participation information will be described using FIGS. 12 and 13. FIGS. 12 and 13 are diagrams illustrating still other exemplary modes of display of group participation information.

FIG. 12 illustrates a display 400B that displays only a list of the terminal devices 20 that participates in group communication and the base station devices 10 (group participation list). The user is able to display the group participation list on the display part, for example, by choosing the success list button 420. As illustrated in FIG. 12, only the base station device 10*a* and the base station device 10*c* are displayed as the base station devices. The terminal device 20*a*-2, the terminal device 20*c*-1, the terminal device 20*c*-2, and the terminal device 20*c*-3 that have participated in group communication are displayed as the terminal devices.

The success list button 420 may be chosen by a touch panel that is formed on the display part or may be chosen by an external key operation. In other words, the processing part 25 receives an operation from the user, generates only a group participation list, and causes the display part to display a generated image.

FIG. 13 illustrates a display 400C that displays only a list of the terminal devices 20 that have not participated in group communication and the base station devices 10 (group non-participation list). The user is able to display the group non-participation list on the display part, for example, by selecting the failure list button 430. As illustrated in FIG. 13, the base station device 10*a*, the base station device 10*b*, and the base station device 10*d* are displayed as the base station devices. The terminal device 20*a*-4, the terminal device 20*b*-1, the terminal device 20*b*-2, the terminal device 20*b*-3, the terminal device 20*d*-1, the terminal device 20*d*-2, and the terminal device 20*d*-3 that have not participated in group communication are displayed as the terminal devices. The base station device 10*a* is in both the group participation list and the group non-participation list and, as in this case, one base station device 10 may be in both the lists. Alternatively, when the terminal devices having participated in group communication is 50% or more of the terminal devices 20 that belong to a base station device 10, a process of adding the base station device 10 to only the group participation list, or the like, may be performed.

The failure list button 430 may be chosen by a touch panel that is formed on the display part or may be chosen by an external key operation. In other words, the processing part 25 receives an operation from the user, generates only a group non-participation list, and causes the display part to display a generated image.

As illustrated in FIGS. 12 and 13, the embodiment also enables separate display of an area of a base station device in which communication is to be carried out and the participation status of other terminal devices. Such display makes it possible to prevent more information than necessary from being displayed on one face of the display and thus prevent the display from being too complicated. This allows the user to easily know the distribution status and participation status that relate to the group communication.

In the embodiment, conditions to be displayed on the display part may be chosen.

Figure 14:
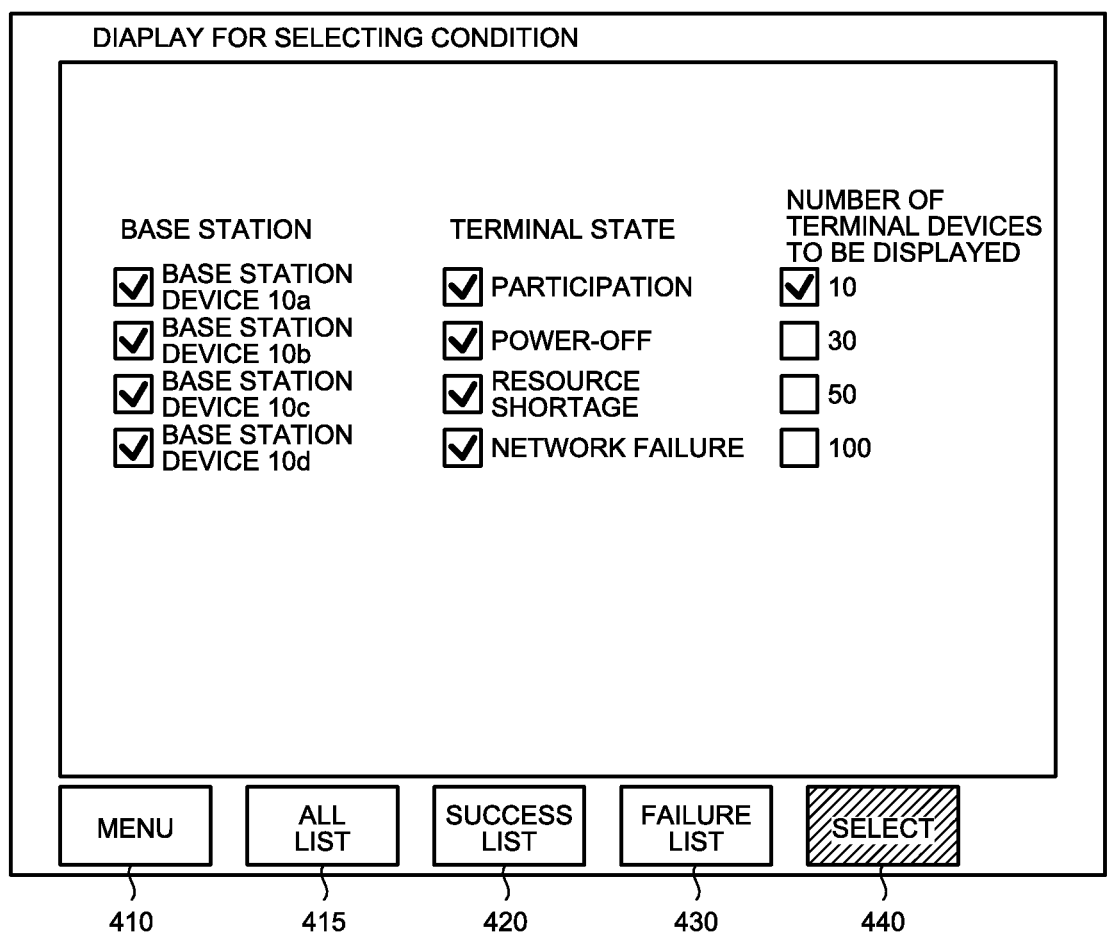
FIG. 14 is a diagram illustrating an exemplary method of selecting display conditions for group participation information to be displayed on a display part.

With reference to FIG. 14, the method of selecting conditions to be displayed on the display part will be described. FIG. 14 is a diagram for describing an exemplary method of selecting display conditions to display group participation information in the display part.

FIG. 14 illustrates a display 400D for selecting display conditions to be displayed in the display part. The user is able to display the display 400D, for example, by choosing a select button 440.

In the display 400D, display conditions to be displayed in the display part are displayed. The display conditions are composed of, for example, multiple types of items. In the example illustrated in FIG. 14, the display conditions are composed of three items (conditions), the base station (condition on the base station), the terminal device state (condition on the terminal device for participating or non-participating in the group communication), and the number of terminal devices to be displayed (number-of-terminal-devices condition). Note that the three items will be described below; however, the items are exemplarily represented and thus do not limit the disclosure. The display conditions may be composed of one or two items, or may be composed of a large number of items.

The base station item section includes items of the base station device 10*a*, the base station device 10*b*, the base station device 10*c*, and the base station device 10*d*. The user can select at least one base station device to be displayed for the group participation information, from the base station device 10*a*, the base station device 10*b*, the base station device 10*c*, and the base station device 10*d*. Thus, it is possible to select a plurality of base station devices. For example, among the base station items, the user can select base station devices to be displayed by checking some of the check boxes. For example, when only the base station device 10*a* is selected, only the distribution result by the base station device 10*a* and the group participation information on the terminal devices 20 that uses the base station device 10*a* are displayed. Here, in the default state, all the base station devices 10 may be selected.

The terminal state item section includes items of "participation", "power off", "resource shortage", and "network fault". The "power off" indicates that the power of the terminal device was in an off-state and thus the terminal device was incapable of participation. The "resource shortage" indicates that the base station device was short of resources and thus the terminal device was incapable of participation. The "network fault" indicates that there was a fault in the network NW connected to the base station device and thus the terminal device was incapable of participation. From these items (options), the user can select at least one terminal state to be displayed for the group participation information. Thus, it is possible to select a plurality of terminal states. For example, from the terminal state items, the user can select items to be displayed by checking some of the check boxes. For example, when only the "participation" is selected, only the terminal devices that have participated in the group communication are displayed.

The "number of displayed terminals" item section includes items of "10 terminals", "30 terminals", "50 terminals", and "100 terminals". In the "number of displayed terminals" item section, the number of terminal devices to be displayed at once on the display part 24 can be selected. The user can select one of these items (options). For example, from these items, the user can select an item to be displayed by checking the corresponding one of the check boxes. For example, when the "10 terminals" is selected, the number of terminal devices displayed at once becomes ten. In this case, the processing part 25 may display all the terminals when detecting operations of scrolling or switching screen pages by a user. By performing such a display, it is possible to prevent the information displayed on one face of the display from being unnecessarily large and making the display too complicated. Consequently, the user can easily grasp the distribution status and/or the participation status related to the group communication.

Here, as a method of limiting the number of terminals to be displayed, the following method may be used. For example, the priority of the terminal devices is stored in advance in association with the terminal device IDs in the terminal device database 331 illustrated in FIG. 4. For example, as the priority, numerical values of "1" to "10" are used such that a larger numerical value indicates a higher priority terminal device. For example, the priority of a terminal device used by an important user, such as a group responsible person or manager, is set to a high value, such as "10". Then, the user can select a condition for the priority of the terminal devices on the display for selecting display conditions similar to the display 400D. For example, the user selects a condition such that "Display only terminal devices whose priority is 8 or more". Then, the group participation information is displayed for the terminal devices that match the condition selected by the user, while the display of the other terminal devices can be omitted. By performing such a display, it is possible to prevent the information displayed on a face of a display from being unnecessarily large and making display too complicated.

After setting the display conditions by using the display 400D, the user can select (press) either one of an "ALL LIST" button 415, a "SUCCESS LIST" button 420, and a "FAILURE LIST" button 430 as illustrated in FIG. 14, to cause the display part 24 to display the group participation information in a desired format. For example, when the "All List" button 415 is selected, the display 400 illustrated in FIG. 11 is displayed. The information displayed at this time reflects the display conditions set by the display 400D.

According to the embodiment, notifying a call-origination terminal device of group participation information at the end of a communication or during a communication allows the user to know the communication status of group communication. Incorporating information on whether terminal devices are able to participate in the group participation information enables the display of terminal devices that are able to and unable to participate with distribution area information of the communication group and not-participating terminal devices with non-distribution area information for a base stations and thus enables more detailed determination on the participation status of the group. The user is able to take necessary measures, such as originating a call again, based on the information displayed on the display. In the above-described description, the information representing the distribution status of group communication is displayed on the terminal device that originates a call for group communication; however, the display is not limited to this, and the information may be displayed on terminal devices in the group other than the call-origination terminal device. Regardless whether terminal devices or other devices belong to the group, the group participation information may be displayed on the terminal devices or other devices. For example, the group participation information relating to group communication of all groups may be displayed on a terminal device or a management terminal device (terminal device for management) that are used by the administrator or the manager of the communication system.

In the embodiment, the information indicating whether the base station device has succeeded in securing a resource and the information on the communication status or a communication failure in the network that is connected to the base station device are used as the base station information. The information is not limited to this and other information may be used. For example, when base station device stops because of a regular maintenance or the like, information indicating the base station state "stop" may be transmitted from the base station device to the management device right before the stop and the information may serve as the base station information (base station operational information). In other words, information indicating that the base station device is "being stopped" may serve as the base station information.

In the embodiment, the acquisition part 34 acquires terminal information containing the state of registration of the terminal devices 20; however, the acquisition is not limited to this. For example, the acquisition part 34 may acquire terminal information (terminal information not containing the state of registration) in which terminal device IDs and base station IDs are associated with each other. In this case, the group participation information that is created by the processing part 32 contains information representing the operational state of the base station device 10 but does not contain information indicating the operational state of the terminal devices 20. For this reason, for example, in the display in FIG. 10, the display mode of the terminal device 20a-2 and the terminal device 20a-4 cannot be changed and both the terminal device 20a-2 and the terminal device 20a-4 are in the same display mode. As for the base station device 10, the same display as that in FIG. 10 and FIG. 11 can be made. Even in such processing, it is possible to display the base station devices 10 relating to group communication and the terminal devices 20 relating to the group communication that is registered in the base station devices 10 to be associated with each other. Furthermore, it is possible to display a base station device that has transmitted a group participation request and a base station device that has not transmitted (were not able to transmit) the group participation request in different display modes. For this reason, it is possible to provide detailed information on the communication status of the group communication to the user. Thus, when a failure relating to a base station device occurs in group communication, the user is able to easily know that information has not been transmitted to the users of call-destination terminal devices.

Further, in this embodiment, an explanation has been given of a communication system for performing group speech-communication that transmits and receives audio data, as an example of group communication. However, the group communication is not limited to this, but may be group communication that transmits and receives data of a text, image, video, or the like. For example, this may be applied to group communication, such as chatting, that exchanges text messages among three or more terminal devices.

Further, an explanation has been given of a business-use radio system as an example. However, the system is not limited to this, but may be another communication system. For example, this may be applied to group communication using a mobile phone network. The terminal device may be a mobile phone, smart phone, tablet terminal, computer (personal computer), or the like. Further, the terminal device does not necessarily need to be portable by users, or may not be movable. For example, the terminal device may be a computer of a desktop type.

According to the disclosure, it is possible to provide detailed information on the communication status of group communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management device comprising:
    an acquirer configured to acquire base station information indicating an operational status of a base station device in group communication and terminal device operational information indicating whether a call-destination terminal device registered in the base station device is in a state capable of receiving the group communication;

a processor configured to create, based on the base station information and the terminal device operational information acquired by the acquirer, communication result information in which information that identifies the base station device, information that identifies the call-destination terminal device, and participation information on the call-destination terminal device whether to participate in the group communication are associated with one another; and a transmitter configured to transmit the communication result information created by the processor, wherein the processor is configured to create the participation information that makes it possible to identify a state of participation where the call-destination terminal device has participated in the group communication, a state of non-participation where the call-destination terminal device does not participate in the group communication due to a factor on a call-destination terminal device side and a state of non-participation where the call-destination terminal device does not participate in the group communication due to a factor on a base station device side.

2. The management device according to claim 1, wherein, in a case where the base station information indicates that a fault was occurred in the base station device, the processor is configured to set the participation information on the call-destination terminal device as the non-participation in the group communication due to a factor on the base station device.

3. The management device according to claim 2, wherein, in a case where the base station information indicates that the base station device was not able to secure a resource necessary for the group communication, the processor is configured to set the participation information on the call-destination terminal device as the non-participation in the group communication due to a factor on a resource shortage in the base station device.

4. The management device according to claim 1, wherein, in a case where a response from the base station device is not received within a given time after a group communication start request is transmitted to the base station device, the processor is configured to determine that the fault has occurred on the base station device side and set the participation information on the call-destination terminal device as the non-participation in the group communication due to the factor on the base station device side.

5. A terminal device comprising:
a transmitter configured to transmit a group communication start request to a base station device;
a receiver configured to receive communication result information including base station identification information that makes it possible to identify the base station device in response to the group communication start request, terminal device identification information that makes it possible to identify a call-destination terminal device registered in the base station device, and participation information on the call-destination terminal device whether to participate in the group communication in association with one another;
a processor configured to create a diagram illustrating terminal device identification information on the call-destination terminal device registered in the base station device and the participation information on the call-destination terminal device in association with the base station identification information, based on the communication result information received by the receiver; and a display configured to display the diagram,
wherein the participation information makes it possible to identify a state of participation where the call-destination terminal device has participated in the group communication, a state of non-participation where the call-destination terminal device does not participate in the group communication due to a factor on a call-destination terminal device side and a state of non-participation where the call-destination terminal device does not participate in the group communication due to a factor on a base station device side.

6. The terminal device according to claim 5, wherein the processor is configured to cause the display to display the diagram illustrating the terminal device identification information on the call-destination terminal device in the state of the participation in the group communication and the terminal device identification information on the call-destination terminal device in the state of the non-participation in the group communication in different display modes.

7. The terminal device according to claim 5, wherein the processor is configured to cause the display to display the diagram illustrating the base station identification information on the base station device in which the call-destination terminal device in the state of the participation in the group communication is registered and the base station identification information on the base station device in which the call-destination terminal device in the state of the non-participation in the group communication due to the factor on the base station device side is registered in different display modes.

8. The terminal device according to claim 5, wherein the processor is configured to cause the display to display the diagram illustrating the terminal device identification information on the call-destination terminal device in the state of the non-participation in the group communication due to the factor on the call-destination terminal device side and the terminal device identification information on the call-destination terminal device in the state of the non-participation in the group communication due to the factor on the base station device side in different display modes.

9. The terminal device according to claim 5, wherein the processor is configured to cause the display to display the diagram illustrating the terminal device identification information on the call-destination terminal device in the state of the non-participation in the group communication due to the factor on the base station device side and the base station identification information on the base station device in which the call-destination terminal device in the state of the non-participation is registered in the same display mode.

10. The terminal device according to claim 5, further comprising an operation part configured to allow a user to select conditions of the participation information,
wherein the processor is configured to cause the display to display the diagram illustrating the base station identification information and the terminal device identification information that meet the conditions selected by the operation part.

11. A non-transitory storage medium that stores a program that causes a computer to execute a process comprising:
transmitting a group communication start request to a base station device;
receiving communication result information including base station identification information that makes it possible to identify the base station device in response to the group communication start request, terminal device identification information that makes it possible to identify a call-destination terminal device registered in the base station device, and participation information on the call-destination terminal device whether to participate in the group communication in association with one another;

creating a diagram illustrating terminal device identification information on the call-destination terminal device registered in the base station device and the participation information on the call-destination terminal device in association with the base station identification information, based on the communication result information in the receiving process; and displaying the diagram;

wherein the participation information makes it possible to identify a state of participation where the call-destination terminal device has participated in the group communication, a state of non-participation where the call-destination terminal device does not participate in the group communication due to a factor on a call-destination terminal device side and a state of non-participation where the call-destination terminal does not participate in the group communication due to a factor on a base station device side.

* * * * *